US009021024B1

(12) United States Patent
Tang et al.

(10) Patent No.: US 9,021,024 B1
(45) Date of Patent: Apr. 28, 2015

(54) METHOD AND APPARATUS FOR CONTROLLING ACCESS TO INFORMATION AND APPLICATIONS BETWEEN CLIENTS IN A TELECOMMUNICATIONS NETWORK

(71) Applicants: Xueming Tang, Canton, MI (US); Hai Yu, Canton, MI (US)

(72) Inventors: Xueming Tang, Canton, MI (US); Hai Yu, Canton, MI (US)

( * ) Notice: Subject to any disclaimer, the term of this patent is extended or adjusted under 35 U.S.C. 154(b) by 42 days.

(21) Appl. No.: 14/052,775

(22) Filed: Oct. 14, 2013

(51) Int. Cl.
*G06F 15/16* (2006.01)
*H04L 29/06* (2006.01)

(52) U.S. Cl.
CPC ...................................... *H04L 67/42* (2013.01)

(58) Field of Classification Search
None
See application file for complete search history.

(56) References Cited

U.S. PATENT DOCUMENTS

| 6,360,222 | B1 * | 3/2002 | Quinn ................................... 1/1 |
| 7,072,665 | B1 * | 7/2006 | Blumberg et al. ......... 455/456.1 |
| 8,155,877 | B2 * | 4/2012 | Baudisch et al. ............. 701/300 |
| 8,838,152 | B2 * | 9/2014 | Tang et al. ................. 455/456.6 |
| 2006/0184578 | A1 * | 8/2006 | La Rotonda et al. ...... 707/104.1 |
| 2007/0240203 | A1 * | 10/2007 | Beck ................................. 726/4 |
| 2008/0214204 | A1 * | 9/2008 | Ramer et al. ............... 455/456.1 |
| 2013/0174223 | A1 * | 7/2013 | Dykeman et al. ................. 726/4 |

* cited by examiner

*Primary Examiner* — Kenny Lin

(57) ABSTRACT

An information system that provides information exchange and application services based on the location and relationships between a landmark client and a service user client. The information service system first builds up direct referral link between a landmark client account and a declared landmark location. The landmark account stores information and applications associated to the landmark client. A service user connects to the information service system via a user client account that stores information and applications associated to the user client. The information service system determines a relationship between the landmark client and the user client using the location and navigation data of the clients as well as their identity and configuration information. The service next builds up information exchange and system control connections between the landmark client and the service user client according to their specified information access and usage rules under prescribed relationship situations.

26 Claims, 14 Drawing Sheets

METHOD AND APPARATUS FOR CONTROLLING ACCESS TO INFORMATION AND APPLICATIONS BETWEEN CLIENTS IN A TELECOMMUNICATIONS NETWORK

CROSS-REFERENCE TO RELATED APPLICATIONS

This application is a continuation of U.S. Provisional Patent Application Ser. No. 61/709,151

TECHNICAL FIELD

The present invention is in the field of computer communication services and business models, pertains more particularly to apparatus and methods for controlling information exchange and application operations between service clients based on their relationship situations including relationship circumstances generated from their location information.

BACKGROUND

Internet and website based information sharing and exchanging system has been successfully expanding our information sharing capability in the last twenty years. The Internet carries an extensive range of information resources and services, such as the inter-linked hypertext documents of the World Wide Web (WWW) and the infrastructure to support email. However, the information system solely based on internet protocol (IP) and websites is inefficient in satisfying the need of individual and immediate information exchanging and application services. This is mainly due to its indirect connection between the service user and the subject of information, especially for the subjects that relate to physical existence. Other obstacles for regular service users include the high cost in establishing and advertising a website, the technical obstacle of making hypertext webpages and links, and its dependency on search engine to find related information contents, etc.

Location based information services appeared in recent years are largely limited in their capability of information management, usage flexibility and scope of applications. These service systems are short of methods to enable setting up location based information services freely at anywhere and for any user. These systems are still expensive to setup and they are not well integrated with existing communications network and location based control systems. Furthermore, their transmitted information is not user-friendly and there is a short of methods for correlating information contents to users' needs and interests. As a result, regular customers find it hardly useful to load such location based applications on their computer devices.

These problems associated to the Internet and location based information system have made it hard for unskilled and common information service users, like small business owners and housewives, to have a place or network space to post and exchange their information timely and cost-effectively with others who have high and immediate information interest with them. Even for skilled internet users, the amount of time and effort used to search for certain information contents on the websites and to find useful information from a large amount of data are frequently significant and very unproductive. More importantly, the subject of information has an important role in information society and informatization construction. The existing information system is incapable to provide smart and connected information services such that the information and application provided have strong correlations and connections to the service users' needs in life and activities.

To solve these identified insufficiency and to bring the next generation smart and connected information service system to reality, this invention presents the location and relationship based information exchange and application service system that first builds up direct referral link between a landmark client account and a declared landmark by defining a landmark client and registering a landmark client account with identity reference to the landmark. The landmark client account stores information and applications associated to the landmark client as well as their access and usage rules. A service user connects to the information service system via a user client account that stores information and applications associated to the user client as well as access and usage rules for accessing the account content and for accepting information and applications.

The information service system determines a relationship between the landmark client and the user client using the landmark location data and the user client's navigation data as well as other client identity and configuration information. The service next builds up information exchange and application operation connections between the landmark client and the service user client by satisfying their specified information access and usage rules under prescribed relationship situations. After that, permission to access authorized information and applications between the clients is granted. The service is able to intelligently and dynamically correlate information resources with information users based on their formulated information interest with respect to their position and activity evaluations.

The basic motivation of the innovative location and relationship based information service system is that a large amount of information is related or associated to certain subjects. And, most of the information in need has strong correlation to an information service user's life and activities including position, environment, time, social status, identification, behavior and intention, etc. Better information connectivity can be established through a mechanism that intelligently relates the user to the subject of information based on situational conditions. Better usage flexibility and connectivity are achieved by enabling service users to formulate their information interest in situational rules. And a larger scope of applications can be realized by enabling location based information services to be established and reached at anywhere, at any time, and by any users.

These objectives are all achieved by the present invention. First, in this system, any user can create client account for posting and exchanging information and applications that relate to a declared landmark without relying on IP, WWW or hypertext webpages. For example, a housewife can declare her house as a landmark and post yard sale information on the landmark client account for sharing with local Moms. There will be no technique obstacle for maintaining such an information resource, no website cost and no waste on advertising a website to irrelevant information users. Second, information associated to subjects can be efficiently organized with well-targeted contents and user groups by formulating relationship situations to correlate contents to interested users. An information user whose virtual or physical navigation has strong relationship with a landmark will be connected to an information resource representing the landmark since the information contents on that resource will potentially have strong correlation with the service users' activity and information in need. Information exchange and application channels are thus more directly and immediately established between information providers and the service users. And the cost on information service maintenance and the effort in finding useful information and applications are all optimally minimized.

SUMMARY OF THE INVENTION

The following summary provides an overview of various aspects of exemplary implementations of the invention. This summary is not intended to provide an exhaustive description of all of the important aspects of the invention, or to define the scope of the inventions. Rather, this summary is intended to serve as an introduction to the following description of illustrative embodiments.

In a preferred embodiment of this invention, an information service system provides information exchange and application services between a landmark client and a service user client. The invention disclosed and claimed herein, in one aspect thereof, comprises a system and methodology for defining a landmark client and registering a landmark client account with identity reference to the location that has been declared for the landmark client. The landmark client account is used to store information and applications associated to the landmark client on the information service system. Furthermore, situation based information and application access policies are formulated in landmark client account configurations. These policies specify on users and their relationship situations to the landmark client for granting access to stored information and applications as well as methods for authorized usages and information contributions.

In another aspect of the invention, a service user connects to the information service system via a user client account which stores information and applications associated to the user client on the information service system. Situation based information and application access policies are formulated in user client account configurations. These policies specify on interested information services and the relationship situations between service hosting landmark clients and the user client for granting such services to access the user client account and user client terminal device systems.

One novel feature of the client connection and information access control services is to evaluate the relationship between a landmark client and a user client including circumstances generated based on the landmark location data and the user client's navigation data. The relationship evaluation can further include circumstances generated using their social and behavioral relation conditions as well as time and environmental data. When their determined relationship satisfies at least one relationship situation specified by the landmark client and at least one relationship situation specified by the user client concurrently, the landmark client and the user client are then paired for building up information exchange and application connections. After that, access and transmission of authorized information and applications are granted to realize information services between the paired clients using their specified communication and application methods.

In some embodiments of the information service system, a client has client terminal device systems connected to the information service system. For such client, information and application access policies formulated for such client will further specify their target for information transmission and application execution among the client account and devices on the client terminal device systems. An information exchange and application service connected to such client further includes communicating information and applications with the client terminal device systems and applying such information and applications on the client terminal device systems.

In yet some embodiments of the information service system, a client is both a landmark client and a user client when providing and accepting information services with other clients. Such a client has client account using dynamically varying location and shape identity attributes to support relationship evaluation with other clients.

Additional features and advantages of the invention will be made apparent from the following detailed description of illustrative embodiments.

DETAILED DESCRIPTION OF THE INVENTION

Figure 1:
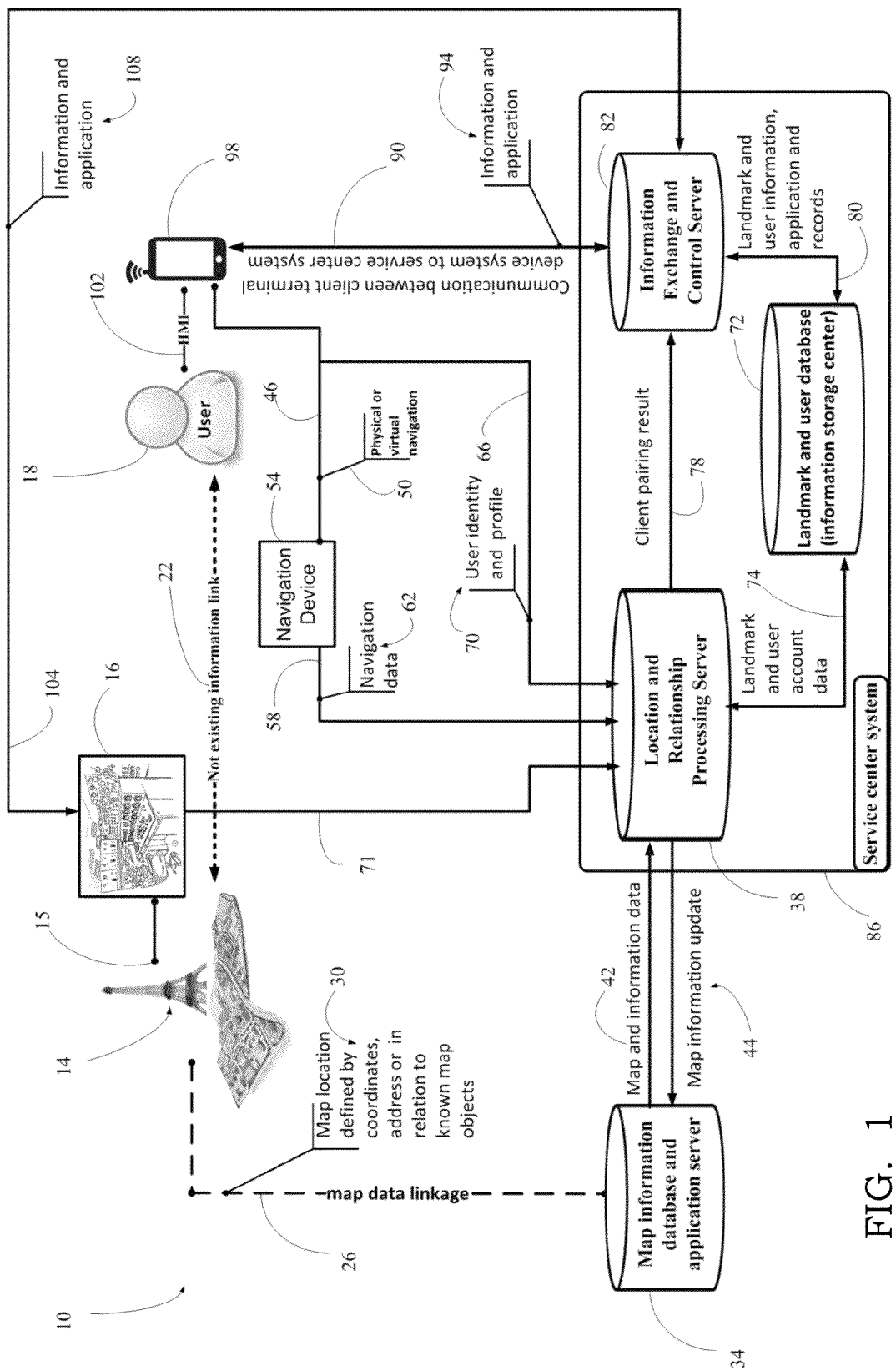
FIG. 1 is a schematic diagram of an information service system that controls service connection and information access between service user clients and landmark clients based on their location and relationships according to one or more embodiments.

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention discloses methods and apparatus for a new information service system that controls connections between service clients and access to information and applications between connected clients based on the location and relationship situations between the clients.

In this system, a client's location is determined with respect to defined coordinate systems and their derived address systems that are provided by a map database and application server. Maps from this database have a place representing each location or object with coordinate data to determine where it is and what is its spatial relation to other reference places. The place with a map location definition can be declared as a landmark in the information service system. Such landmarks are further defined as landmark client to give them identity and capability to hold and host information services to the rest of the client community on this information service system. A landmark client specifies relationship situations that other service clients shall satisfy in order to access its hosted information and application services. A landmark client may further specify relationship situations that other service clients shall satisfy in order to contribute information and application to the hosting landmark client account.

A service user client connects to the information service system from a user terminal device system and the user client accesses the information services via a user client account. A service user client reports its navigation data to the system from which position of the user client is determined with respect to map coordinate systems from the map database and application server. As a result, spatial relationship between a landmark client and a user client can be determined based on the user's navigation position and the landmark's reference location. Furthermore, behavioral relationship and intention relationship between them can also be estimated and predicted from their location data and location history records. A service client specifies relationship situations that other clients shall satisfy in order to provide or accept information and application services. Such relationship situations mostly contain spatial and behavioral relation circumstances. The relationship situation formulation mechanism not only give the service clients a method to define and prescribe their service interest, but also enable the information service system to achieve optimal correlation evaluation between information users and information providers.

After a landmark client is paired with a user client for information services by satisfying specified relationship situations, the information service system establishes service connection link between the two clients over telecommunications network. Client individually specified communication system and methods will be used in the established connection. Received information and applications will be directed by the information service system between the clients. Such information and applications will reach either their client accounts or their client terminal device systems for information usage and application executions.

There are many different embodiments to build up information exchange and application connections between clients. One of the primary methods utilizes mobile navigation devices in client terminal device systems to determine the position of user clients. An exemplary navigation device is a GPS device that receives Global Positioning System (GPS) signals for the purpose of determining the device's current geographical location (latitude, longitude, and altitude), heading direction, speed and time as well as other derived navigation information from the aforementioned base signals. Most importantly, such navigation behaviors and the geographic relationship between a user client and a landmark client can be mathematically modeled using these devices while a user client is physically navigating on Earth. A landmark client can be selected for information services when the navigation behaviors and geographic relationship between the landmark client and a user client satisfy relationship situations both specified by the landmark client and by the user client concurrently. Such relationship situations also specify on other relationship criteria as well as information filtering and accessibility conditions.

For example, a landmark client is a restaurant and it specifies two relationship situations as: RS#1: post menu, today's special and promotion information to user clients within 1 kilometers range to the restaurant location; RS#2: add customer reviews to the restaurant's landmark client account if a user client is inside the landmark location. A user client specifies a relationship situation as: open to candidate information service from landmarks within 100 meters distance. When the user is within 100 meters range to the restaurant as reported by its GPS position, their relationship satisfies relationship situations from both accounts concurrently. The restaurant is then paired with the user for connected information service by the information service system. The restaurant menu, daily special and coupon will be delivered to the user's smartphone device once confirmed acceptance of the service by the user. When the user is in the restaurant, its smartphone is reporting that the user's GPS position is within the restaurant landmark's location. The relationship situation for adding customer reviews to the restaurant landmark account is further satisfied. The user is now able to access the records of customer reviews on the restaurant client account from the user's smartphone. Then, a customer review application provided by the landmark client is loaded on the user's smartphone for adding new reviews. The quality of the experienced food services will be ranked while the user client is staying in the restaurant.

For another example, a landmark client is a hotel by a freeway. The landmark client specifies a relationship situation as: provide available room and discount room rate information if a user client is driving along the freeway towards the hotel at a speed higher than 60 mph during 4 p.m. to 10 p.m. and the estimated arriving time is less than an hour. A user client specifies a relationship situation as: open to landmarks in lodging and dinning categories when the distance to home is more than 100 miles during 5 p.m. to 7 p.m. At 6 O'clock in an afternoon, the user is driving towards the hotel on the freeway besides the hotel landmark at a speed of 70 mph. The user connects to the information service system from a vehicle and the vehicle's GPS device report the user's location to the system. The information service system detects that the client's location is 234 miles away from the user client's indicated home place. The hotel landmark is paired with the user client for providing hotel information and promotion services when the information service system further estimated that the user can reach the hotel landmark in 50 minutes at its current indicated speed from the GPS device.

With reference to FIG. 1, an information service system for controlling information exchange and application operation between service clients based on their relationship situations is illustrated in accordance with one or more embodiments and is generally referenced by numeral 10. The information service system 10 comprises a landmark client 14, a user client 18, a service center system 86, a map database and application server 34, a user client terminal device system including a navigation device 54 and a computerized device 98. Other embodiments of the system further have client terminal device systems 16 connecting to the service center system 86.

The map database and application server 34 provides definitions for coordinate systems and their derived address systems to support location and relationship evaluations in the system services. The maps used are consistently defined and they are used both by the navigation devices 54 and by the service center system 86. The map database and application server 34 is not necessarily centralized but it is centrally represented in this figure. A map location is a visual representation of the physical existence of a place according to one defined coordinate system.

For one embodiment, a map from the map database 34 is a universal map that defines geographical positions of objects and places with respect to geographic coordinate system. A place in this system is defined by its longitude, latitude and may also include altitude. For another embodiment, a map from the map database 34 locates objects and places with respect to local area maps using locally defined coordinate systems. Some may also use relative spatial relation definition with respect to reference locations and objects. Exemplary local area maps include building map, park map, exhibition map, etc. For yet another embodiment, a map from map database 34 locates objects and map application user's virtual presence in computer program simulated environments, like on digital maps, or in virtual reality applications. For example, a Google maps on a computer determines a virtual navigation to a map position without requiring the user physically at there. The virtual navigation function can also report position in longitude, latitude and even with altitude. Such position data are derived from map center position, map scale, map range and region coverage, map displaying mode, map navigation direction and moving speed, etc. Other example location determination maps include the virtual location determined from a uniform resource locator (URL).

The map database and application server 34 further connects to other information systems including geographic information system, weather and environmental information system and transportation information systems to retrieve location based information data. As shown by 44, the map database and application server 34 updates its records when receiving new map data and definitions from the information service system 86.

The illustrated embodiment depicts the landmark client 14 as the Eiffel tower, which has map coordinates defined for its location and shape as well as its geographic relationships with other map objects 30. Such geographic data 30 are established through map definition processes like cartography measurements 26. A landmark is a place or object with location and shape defined according to one of the map coordinate systems used in the map database 34. A landmark client 14 is declared for a landmark location or object by assigning unique identity attributes.

A landmark client 14 has map location, geometric shape and boundaries defined to identify where and how it is. A landmark can be a point location with a single point coordinates defining its existence. A landmark can be defined by a line, a path, a route, connected lines and curves with a sequence of coordinates of point locations to identify its place and trajectory. Such landmarks also have outlined shape defined around its trajectory coordinates.

A landmark can be defined by a region enclosed by connected lines, curves, or a polygon or circular shaped areas, with specified or default height. The identifying coordinates of the landmark can be inside or on the boundary of the landmark. Furthermore, a landmark can be a group of such regions. A landmark can be defined by a space shaped by connected lines and curves. It can also be defined by polyhedron, spherical or cylindrical shaped spaces. The identifying coordinates of the landmark can be inside or on the boundary of the landmark. Furthermore, a landmark can be a group of such spaces.

A landmark can be defined by an existing object or a combination of existing objects that has been known with coordinates and geographic identifications. Existing landmark usually has address defined for it. A landmark can also be identified constructions or landscapes. Such objects includes but not limited to a sculpture, a plant, a building, a park, a road, a bridge, a institute or organization, a hill, a river, a lake, a country, a state, a highway/freeway road, an airport, a train station, a library, a vehicle, a planet, etc. It can also be a group or combination of the aforementioned objects. A location or object can be associated to multiple declared landmarks. Location area/space overlap and inclusion are allowed in landmark declarations. Landmarks already defined can be grouped or combined to construct a new landmark. A landmark can have connected area/space or it can comprise distributed areas/spaces.

A landmark client 14 can optionally have landmark terminal device systems 16 connected to the service center system 86 to realize certain control operations and functionalities. As represented by 15, the landmark terminal device system 16 can either at the landmark location or at locations associated to the landmark client 14. Such operations and functions can be accessed by the service center system 86 and other authorized user clients 18 via communication connection 104 to process information, to communicate processing results and to execute applications for system controls. Landmark terminal device systems connect to the Information Exchange and Control Server (IECS) 82 on the service center system 86 to transmit information and application 108.

A landmark client 14 defined is not necessarily stationary. A dynamic landmark can have varying identifying location coordinates/address as well as varying geometric shape and boundary specifications. Such dynamic landmark identity attributes can change with respect to the location and region variations of an object, an event or a schedule. They can also change with respect to time and other conditions. Such dynamic landmarks are useful for declaring mobile information subjects like weather zone, activity event, emergency control region, etc. They can also be regions or route sections that hold certain activity, sports or social event, in a certain time period. Dynamic landmarks have landmark terminal device systems 16 connected to the service center system 86 via 72 to report its identity and the variations in their identifying location, shape and boundaries. The landmark terminal device systems for dynamic landmark necessarily include navigation devices or equivalent location detection mechanism.

In the information service system 10, the landmark client 14 is the information subject for the landmark client account registered for it. A landmark client account is the information resource to an information subject and it contains all the records, information and application data for landmark oriented information services.

In one application embodiment, the user 18 wants to have information service connection to access information and functions related to landmark client 14. In another application embodiment, information and applications from the landmark client 14 request to access and control the functionalities available on the user's terminal device 98. Such desirable information exchange and application channel between the landmark client 14 and the user client 18 is depicted by the dotted line 22, which does not traditionally exist without the invented information service system 10.

The physical or virtual navigation signals 50 are received from a user's terminal computerized device 98. The navigation signals are processed using navigation function 46 provided by navigation devices 54. Such navigation devices 54 can be attached or embedded to the user's terminal computerized device 98. Navigation devices report its position with respect to defined coordinate systems from the map database 34. It may also support determining the direction, velocity, acceleration, and action of the device, recording navigation histories, and predicting future route, stop site and destinations, etc.

In one embodiment, the navigation devices 54 receive signals based on geographical positioning systems to determine the device's location on Earth with latitude and longitude, and some may also calculate altitude. Alternatively, they receive signals based on locally defined positioning systems to locate objects or people inside a building or in an area with respect to locally defined coordinate systems or in relation to known positions and objects.

In another embodiment, the navigation device 54 can be virtual navigation device that locates objects or people's virtual presence in computer program simulated environment, like on digital maps, or in virtual reality applications. An application client's location can be determined by its virtual presence location, for instance, a mouse cursor position on a digital map. Furthermore, navigation behavior data, including map navigation direction and moving speed, can also be derived together with the map setting parameters like map center position, map scale, map range and region coverage, map displaying mode, etc. For another example, virtual client location is determined from a uniform resource locator (URL).

Navigation devices 54 may also report translational motions (velocity and acceleration, distance passed, etc.) and rotating rates (yaw, roll and pitch) measured from inertial measurement unit. Dead reckoning navigation can also be achieved by using a previously determined position and advancing that position based upon known the estimated speeds over elapsed time. Navigation devices 54 may also report its direction measured or estimated from direction detection mechanism and methods. Such inertial measurement unit and direction detection devices can reside either on the navigation devices or be integrated to the client terminal devices.

The navigation system 54 has communication connection 58 to report navigation data 62, time and behavior/activity data to a Location and Relationship Processing Server (LRPS) 38 on the service center system 86. The user 18 also has communication connection 66 to LRPS 38 to report user identity and user profile information 70 such that LRPS 38 knows for whom and from where the service is requested. Such location update and connection can be realized for a dynamic landmark client in the same manner. The location reporting mechanism including devices and processes represented by 46, 50, 54, 58, 62, 66 and 70 is replicated and represented by connection 71 for dynamic landmark terminal device systems. All these connections between client terminal device systems and the service center system 86 can be realized through the telecommunications network.

The LRPS 38 obtains map and location based information data 42 from the map database and application server 34. Furthermore, LRPS 38 also support map database applications by reporting updated location information 44 from connected clients to the map database and application server 34. LRPS 38 interprets the client location with respect to the map definition data received. The LRPS 38 updates the client location attributes for client accounts on a Landmark and User Database (LUD) 72, which is a memory based information storage center station.

After receiving a user's identity 70, the LRPS 38 will retrieve the user account information, account settings and configurations 74 from LUD 72. The LRPS 38 then determines the set of conditions for landmark client selection based on the user account settings and configuration parameters 74. From LUD 72, the LRPS 38 will screen landmark client accounts and determine an initial set of candidate landmark clients for information service with the user client. LRPS 38 then retrieves the client account information, account settings and configurations 74 for all the candidate landmark clients from LUD 72. For a candidate landmark client and the user client, LRPS 38 interprets spatial relationship between them from the processed location data. LRPS 38 can also derive the client's navigation behaviors and activities from received navigation data. After that, the relationship between the landmark client and the user client is determined including circumstances generated based on the landmark location data and the user client's navigation data. Such relationship evaluation method can further include circumstances generated using the client's social relationship, behavioral relation conditions as well as time and environmental conditions.

When their determined relationship satisfies at least one of the relationship situations specified by the landmark client and at least one of those specified by the user client concurrently, the landmark client and the user client are successfully paired for building up information exchange and application connections. Client pairing result 78 is generated to indicate the type and content of information services that best matches the interests of the paired clients. The client pairing result further specifies how connection can be established between paired clients and what information and methods can be applied for information applications. Client pairing result is sent to IECS 82 to build up information exchange and application connections between the user client and the landmark client comprising the internal client account connection 80, the communication connection between client terminal device system to service center system 90 and 104. The connection established comprises one or multiple of the following ways: 1). connection between user client account to landmark client account; 2). connection between user client account to landmark terminal device systems; 3). connection between user terminal device systems to a landmark account; 4). connection between user terminal device systems to landmark terminal device systems.

IECS 82 retrieves the connection methods from the paired landmark client account and the user client account on LUD 72. IECS 82 generates commands and messages for transmitting information and applications 94 between the service center system 86 and the user client terminal device 98 using user specified communication and control methods. For landmark client 14 with landmark client terminal device systems 16, IECS 82 generates commands and messages for transmitting information and applications 108 between the service center system 86 and the landmark client terminal device 16 using landmark specified communication and control methods.

Based on client paring result, IECS 82 builds up information and control connection over existing computer and communication networks to allow data and operation transmission between paired client accounts and client terminals. From the client pairing result 78, IECS 82 recognize what information from which landmark account is to be transmitted to which network communication terminal address and in what format. The functions of IECS 82 further include: first, from client accounts on LUD 72, load the requested information content and operations 80 and transmit them to the destination client account or terminal devices; second, from client terminal device systems, receive data and transmit the data to their paired client terminal device system; third, from client terminal device systems, receive data and update the content and record of their paired client account on LUD 72; fourth, send to LUD 72 the received information and application data to update corresponding contents on client accounts; fifth, generate management operations to command LUD 72 to process information and operation records between client accounts.

A landmark information account is a knowledge library that contains information related or associated to the landmark client 14. Some information can just indirectly relate to the landmark or to the certain functions of the landmark. For example, a declared bulletin board landmark at a place can have any type of message post on it. The LUD 72 contains a landmark database that stores landmark accounts and their records, account configuration and property, landmark information and control operation methods. The LUD 72 also contains a user database that stores the records, account configuration and property, settings and control methods associated to service user accounts. Both landmark account and user account on LUD 72 have their communication address and methods specified. The storage center for LUD 72 can have a centralized or distributed storage architecture, which means that the information on the storage center can be centrally organized or it can be distributed to multiple storage data centers. LUD 72 provides data 74 containing client accounts' identity and configurations to LRPS 38. LUD 72 updates location attributes for landmark accounts and user accounts when data 74 containing account updates are received from LRPS 38. LUD 72 retrieves and delivers information contents, communication methods and control methods 80 from landmark account and user account when requested from IECS 82. LUD 72 saves data and operation associated to client accounts 80 when received from IECS 82.

One embodiment of the information service function is to transmit landmark account information to a user client terminal service device 98. According to a client pairing result 78, IECS 82 recognize what information contents from which landmark account is to be transmitted to which network communication terminal and in what format. The information content 80 will then be retrieved by IECS 82 from LUD 72. The information data is then packaged into message and send to the telecommunications network using the user client specified format and methods. After the information is received at the user's terminal service device 98. The information will be processed either by general service application program or by client specified application programs. The processing results are then presented to the user client 18 using Human Machine Interface (HMI) 102. The HMI communicates to a user client 18 in many manners including visual display, audio or haptic motion, etc.

A second embodiment of the information service function is to contribute information to a landmark client account from a user client terminal device 98. For a paired and connected landmark client 14, a user client 18 can input new information to the client terminal device 98 and command to add the information content to the paired landmark client account. The user client terminal device 98 will package the information contents into communication message and send them to IECS 82. IECS 82 processes the received message to obtain the information contents and their target landmark account identity. After that, the information contents are sent to LUD 80 to be added on the target landmark client account. User client contributed information contents can also have specified property associated to identify their source, time, category, and to make information access rules.

A third embodiment of the information service function has a landmark client 14 with client terminal device systems associated to it. In this case, the landmark client terminal device system connects to the service center system 86 via the telecommunications network. The functionalities provided by the landmark client terminal device system can be used by paired user clients after access authority is granted. Advanced system control function may be realized with applications that provide API and control algorithms that can be operated either on user's terminal device 98 or on the IECS 82. For example, a PTZ network camera at a declared landmark location can be used by permitted users to control the camera view using network API based control applications that are loaded onto the users' client terminal device system from the landmark client account. The systems at the landmark place may also report system states, operation status, operation condition and permissible operations to IECS 82. Such information can be saved to the landmark information account at LUD 80 or it can be sent to users' terminal device system 98. A control operation from a user client can be transmitted to the landmark client device system once received for control execution. Alternatively, such control operation can either be saved to LUD 80 or kept at IECS 82 for execution by the landmark client terminal device system when certain time, state or status conditions will be satisfied.

A forth embodiment of the information service function gives the control authority to functionalities provided by a user's terminal device system such that a paired and authorized landmark client can access and operate the user terminal device system to realize applications. The user terminal device system reports its time, states, status and available functions to IECS 82. IECS 82 directs such user client information to the landmark client account or to the landmark client terminal device system to generate reactive control commands or operations using computer program applications. After that, IECS 82 will transmit the received control commands or operations to the user client terminal device system to realize the control functionality. For example, a landmark client is a speed control zone that regulates all vehicles inside the landmark region to be less than 35 mph. A user client terminal device system is a vehicle that reports its speed state to IECS 82. The vehicle will be paired with the speed control zone landmark client once it enters into the landmark region. IECS 82 load the speed control zone application from landmark client account and the application program process the received vehicle speed and it generates a propulsion torque reduction command to force the vehicle to slow down when it detects that the vehicle speed is larger than 40 mph. Furthermore, in similar manner, a remote operated vehicle adaptive cruise control function can be realized between a speed control landmark client and a vehicle type of user client terminal device system.

Figure 2:
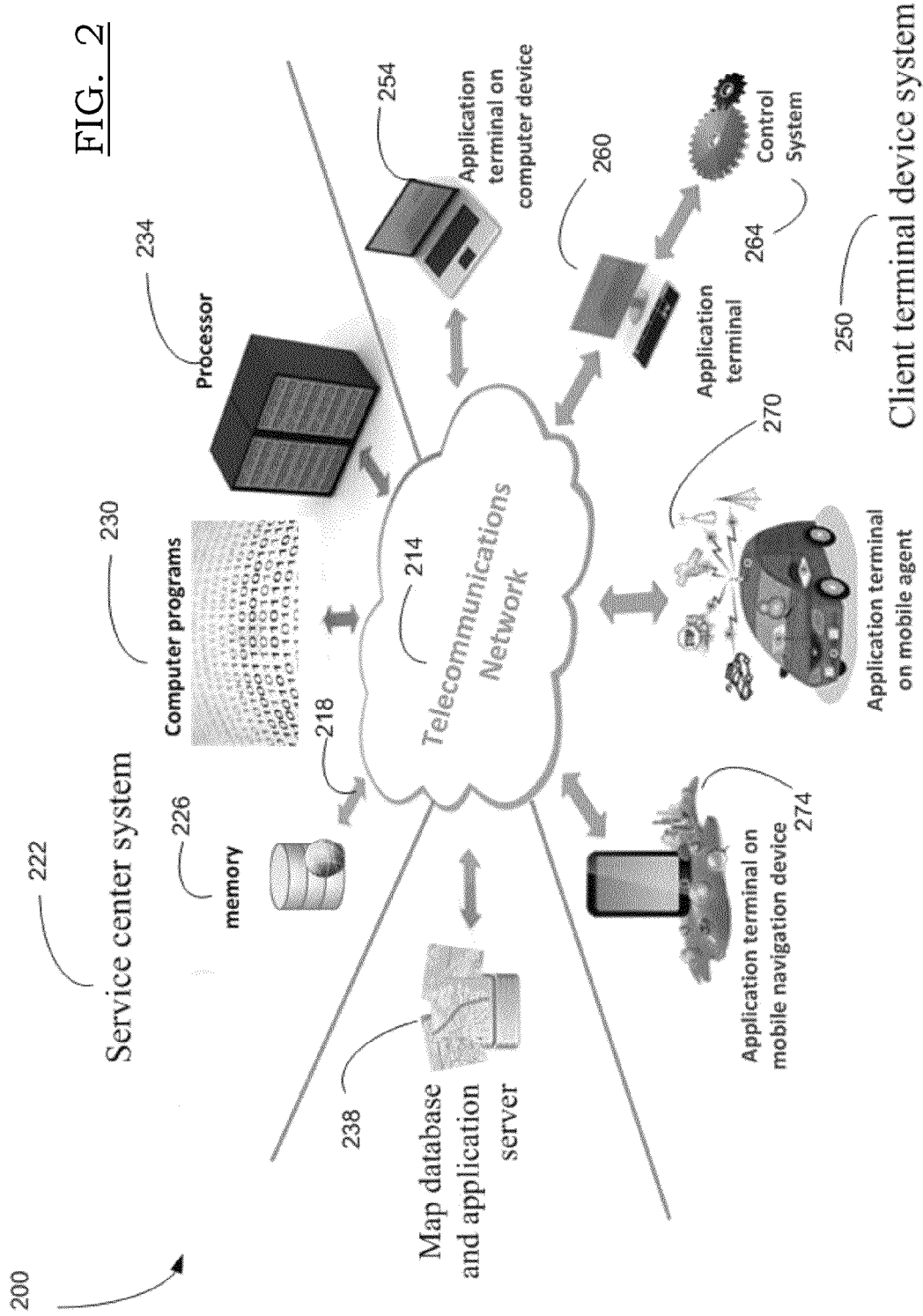
FIG. 2 is a schematic diagram of apparatus in the information exchange and application service system of FIG. 1, illustrating its components and interconnection between its service center system and different service subsystems.

As illustrated in FIG. 2, the location and relationship based information service system 10 is now depicted by 200. The system 200 comprises four sections of components: the service center system 222; the telecommunications network 214; the map database and application server 238; the client terminal device system 250.

The telecommunications network 214 connects all the components in the information service system. It provides communications 218 on data, message, command and operation between all the components and subsystems as well as their associated equipment and machinery. The telecommunications network integrates computer networks, radio networks, telecommunications networks, and local area communication and control networks. Embodiments of such networks comprise wired communication networks (Internet, Intranet, telephone network, controller area network, Local Interconnect Network, etc. and the like) and wireless networks (mobile network, cellular network, WiFi, Bluetooth, etc. and the like).

The service center system 222 comprises information storage memory 226, processor 234 and computer programs 230. The information storage memory 226 provides storage space for all the data, instruction and programs used by the information service system as well as for client account records, settings, client information and applications. The processor 234 operably coupled to the memory and the telecommunications network for providing computing and processing capability to run the operations and application programs 230 both on the information service system 200 and from client applications. The processor 234 executes instructions comprising: 1). instructions to declare a landmark using services based on said map information database and application server; 2). instructions register a client account; 3). instructions to configure a client account; 4). instructions to manage and maintain a client database.

The computer program 230 comprises the functions to support the client connection and access control services. These functions together construct an application platform where the information and controls between landmark clients and user clients got managed between appropriate data storage places 226 and client terminal device systems 250. The operations of these programs enable functionalities of server applications including LRPS 38, LUD 72 and IECS 82. Such functionalities comprise: 1). receive navigation data 62 from client terminal device systems 250 and update the location attribute for corresponding client account on LUD 72; 2). determine the relationship between two clients with relationship circumstances generated based on the locations of both clients; 3). generate client pairing result 78 for two clients to specify accessible information and applications between clients and the methods of using them; 4). establish information service connection for paired clients; 5). direct received service inquiry and command from a client to its paired client; and 6). transmit received information and applications from a client to its paired client.

The map database and application server 238 is the same as the server 34 on FIG. 1. All the map data defined to support the location determination and relationship process services are deposited on this database. Such data defines geographic positions of objects and places on earth as well as their relative relationships with other objects and places. Furthermore, for moving objects, their navigation and behavioral relationships with respect to the map coordinate system and other objects and places can also be determined based on the map data. Besides the global geographic map data, the map database 238 also contains locally defined maps for local positioning systems and virtually defined maps for virtual reality and digital map applications.

The client terminal device systems 250 provide control and communication methods for service clients to access the service center system 222. Such systems have processor and memory operably coupled to the telecommunications network 214 to support running application programs from information exchange and application controls. The processor is configured to execute a program of instructions, when executed, causes action of the client terminal device system 250 comprising: 1). get access to service center system 222 via a registered client account; 2). generate messages containing client identity 70 and navigation data 62 and send the message to the service center system 222; 3). generate inquiry from client inputs to request information and applications; 4). generate new information and application from client inputs; 5). packaging and sending message containing information and applications to the service center system 222; 6). packaging and sending message containing requested information and applications to the service center system 222; and 7). unpack received message and apply contained information and applications to computerized devices on the terminal device systems 250.

The client terminal device system 250 comprises computerized devices for communicating and processing information and applications as well as for communicating the processing results to a service client. Exemplary embodiments of the computerized terminal device includes: 1). Stationary and portable computers 254 that connect to the service center system 222 through telecommunications networks; 2). mobile communication and computer devices 274 like smartphone, tablet computer and navigation device and the like; 3). mobile agent devices 270 like vehicles, robots, field appliance and the like; 4). application terminals 260 that have associated control systems 264 for providing control, communication and other application functionalities. Exemplary control systems include traffic light control system, road light control system, onsite alarm system, surveillance and security camera control system, etc. Client terminal device systems 250 that have associated control systems 264 also provide communication and control methods to operation the control systems 264.

An application terminal device system 260 at a landmark place can provide certain functionality for information exchange and display or for system operations using the control system 264. For example, the control system at a landmark place is a lighting system whose lighting sequence and pattern can be changed to light different area or to form a certain light figures. For another example, the control system at a landmark place is a big screen that can be used to display user client uploaded images and movies. To operate a control system, control command set and control functions are defined for a client account. Applications for operation such control systems are usually downloaded from the control system's hosting client account to user terminal devices 98 to operate the control systems and to realize the service functionalities.

The client terminal device system 250 comprises navigation devices 54 to receive signals from which client navigation data 62 are generated. Such navigation device 54 determines the client navigation data 62 with respect to at least one of the defined geographic, local or virtual coordinate systems on the map information database and application server 238. Advanced navigation devices 54 also generate navigation data 62 including translation and rotation motion measurements from an inertial measurement unit (IMU) as well as facing or heading direction determined from a direction detection mechanism. Exemplary embodiments of such navigation devices include GPS device on vehicles, smartphone GPS system, integrated GPS and IMU devices, local positioning devices and even computer pointing device like computer mouse and touchpad.

In order to declare a location as a landmark client, a service user first loads an information service application program 230 on a client terminal device system 250 and then connects to the service center system 222. In a first embodiment of the landmark declaration method, a landmark is declared and defined using a digital map application. The computer program on the client terminal device systems 250 obtains map data from map database 238 and displays the map in certain digital map navigation view.

Figure 3:
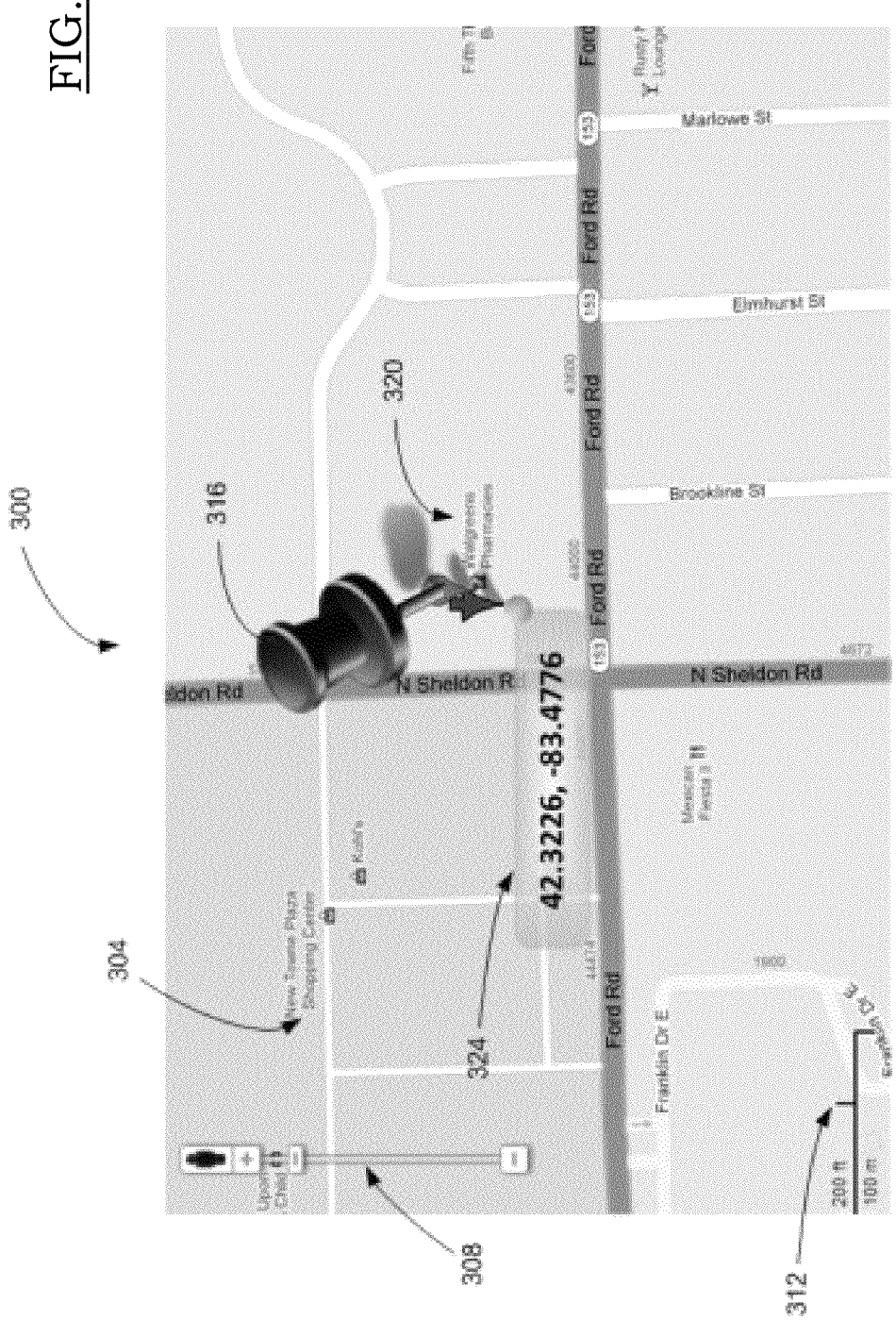
FIG. 3 is an illustration of stationary landmark declaration method for a point type of map location.

With reference to FIG. 3, a procedure to define a map location is illustrated in accordance with one or more embodiments and is generally referenced by numeral 300. The information service application program loads a map 304 and displays a target region 308 in proper scale 312. Select a point position 320 on the map using a landmark locator tool 316 and obtain its geographic location data 324 including its longitude and latitude coordinates. The map location identified can then be declared as a landmark with the coordinate data 324. For example, as illustrated in FIG. 3, the position with coordinate data (42.3226, −83.4776) is declared as a landmark and it is further defined for a landmark client called "Walgreens Pharmacies".

Figure 4:
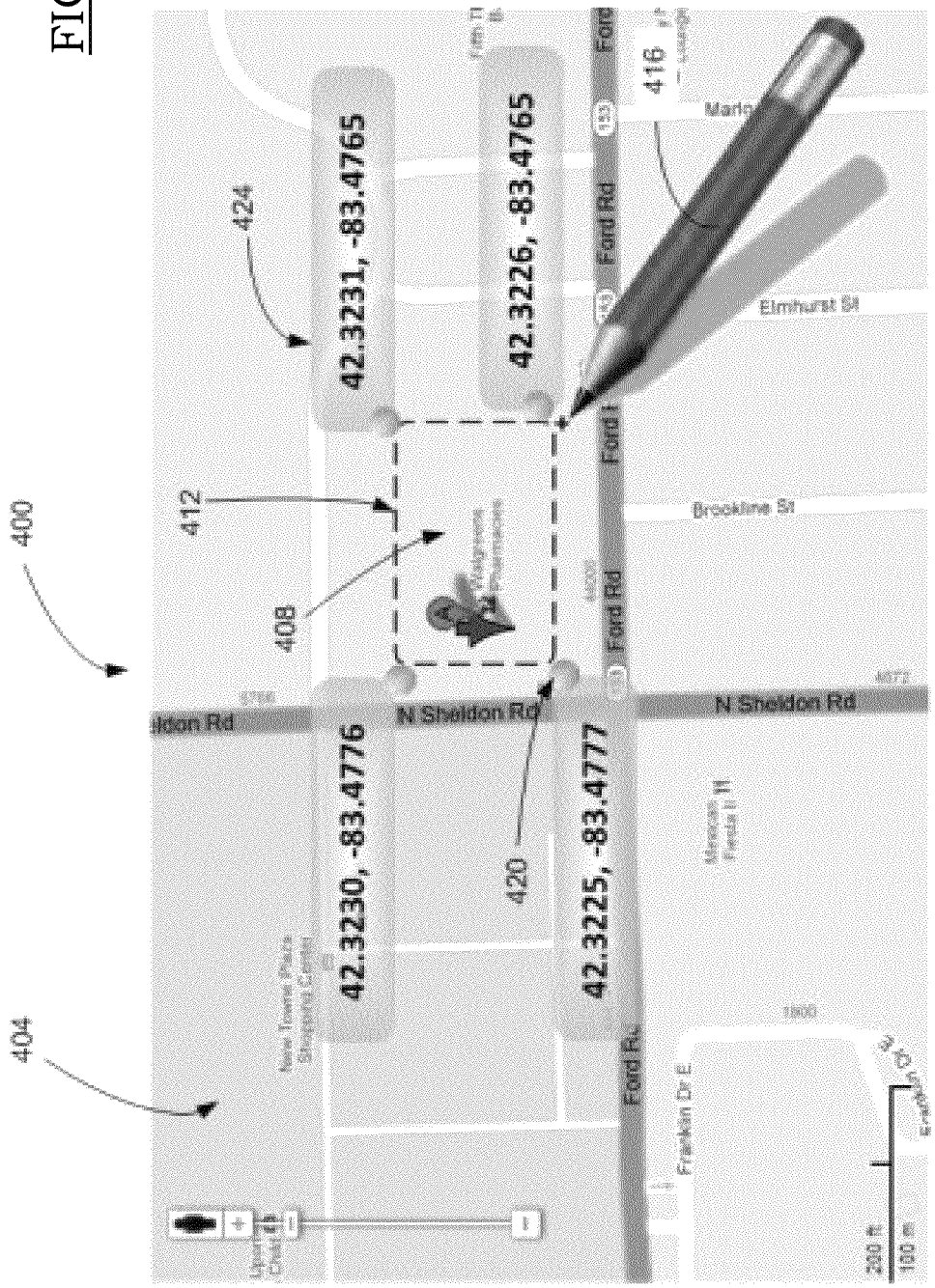
FIG. 4 is another illustration of stationary landmark declaration method for a planar region type of map location.

A second embodiment of landmark definition method defines a map location by a geometrically shaped area on a map. With reference to FIG. 4, a procedure to define a map region is illustrated in accordance with one or more embodiments and is generally referenced by numeral 400. After loading the digital map application 404 and navigate to the target map area in proper map scale, a user uses landmark shaping tool 416 to define a map region using certain geometric shapes. A set of location points 420 are used to represent the defined boundary lines 412 of the shaped area 408. The coordinate data 424 of the set of points and their interpolated points determine the map location of the landmark to be declared. Lines or curves connecting all these points determine the boundary of the landmark. An illustrative example is shown in FIG. 4 where a "Walgreens Pharmacies" landmark is defined by a rectangular region.

Figure 5:
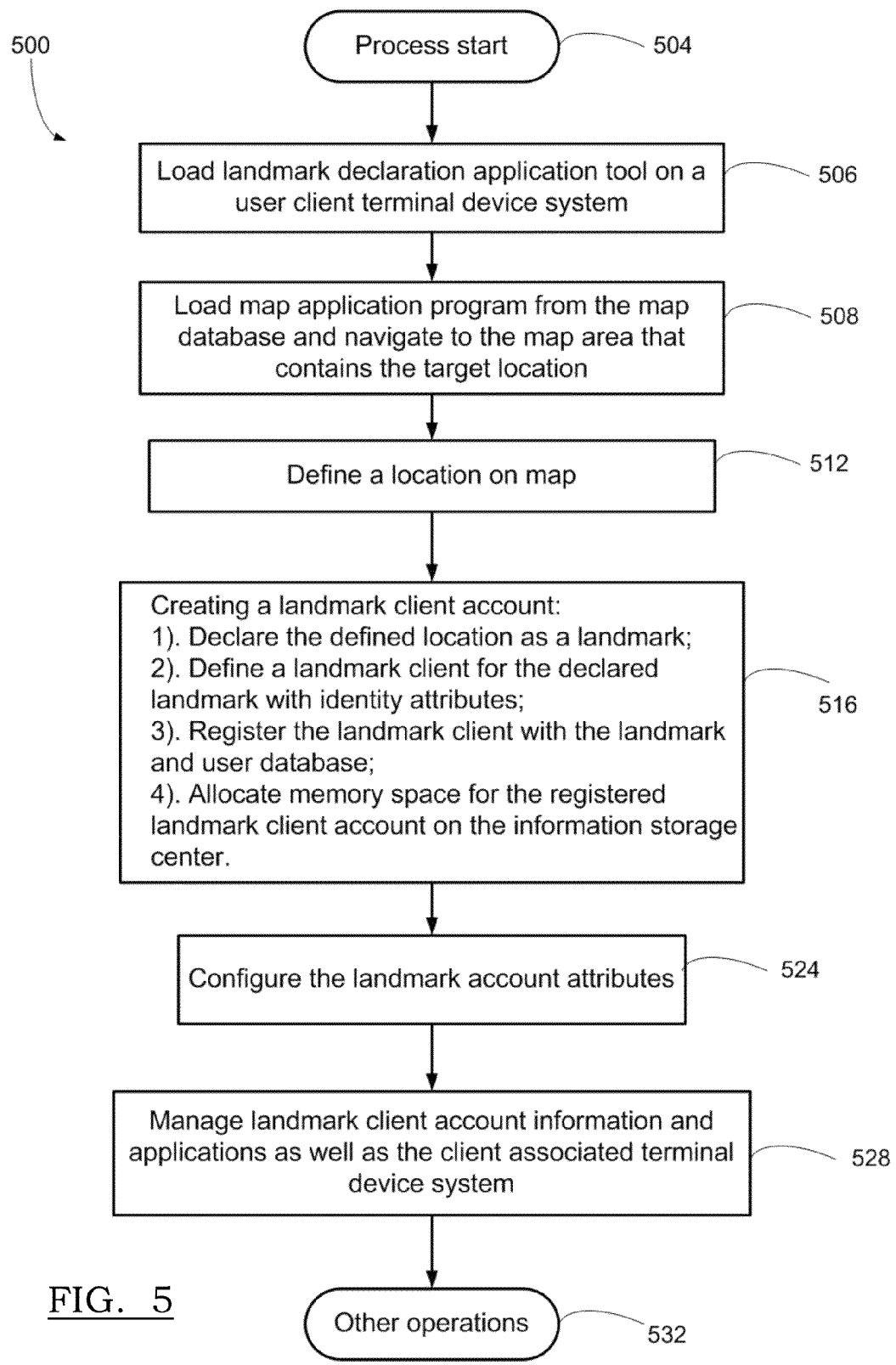
FIG. 5 is a flowchart illustrating a method for declaring a landmark on digital map application and for establishing a landmark client account for the defined landmark client.

With reference to FIG. 5, a procedure to declare a landmark on digital map application is illustrated in accordance with one or more embodiments and is generally referenced by numeral 500. After the process starts 504 on a client terminal device system using the information service system's application program, a user first uses landmark declaration application tool at 506 to load a digital map application from map database and application server 238. On this digital map application, a user navigates the map to reach a target area with proper map scale and scope at 508. Next, a location on the map can be defined using map location definition methods similar to the embodiments of methods presented in FIG. 3 and FIG. 4. After a map location is defined with coordinate identity at 512, a user next declares the defined map location as a landmark at 516 and then a landmark client is defined by assigning unique identity attributes to the declared landmark. A landmark client account can next be registered for this landmark client on the service center system 222 with memory space allocated to save landmark client account associated information and records. Landmark client account's configuration attributes is next specified to prescribe the way how the landmark account is expect to serve in the information service system at 524. Service users can then manage information and applications on the registered landmark client account as well as its associated client terminal device systems if any at 528. At this point, a landmark client account is successfully established and the procedure will continued with other operations at 532.

Figure 6:
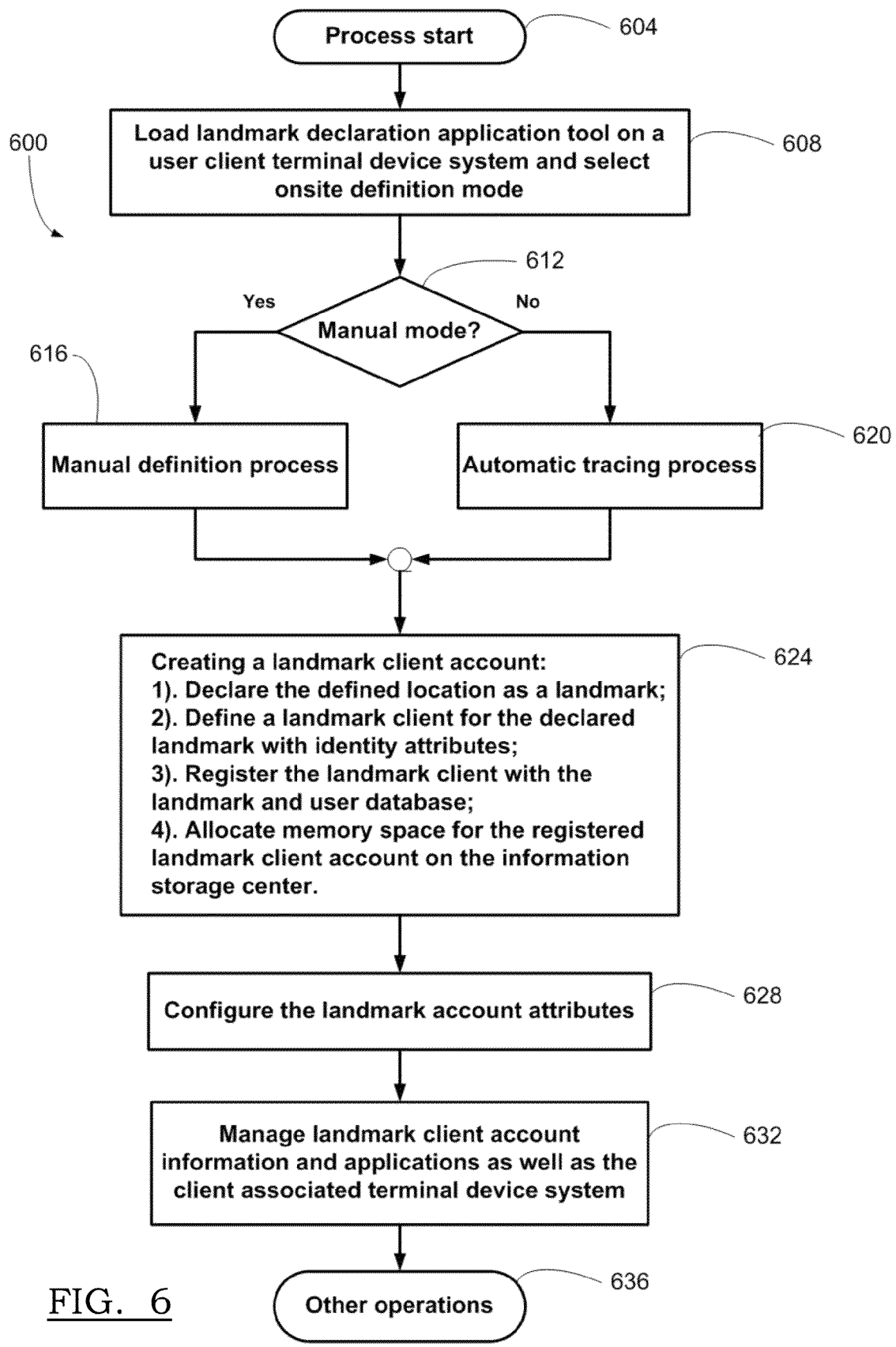
FIG. 6 is a flowchart illustrating a method for declaring a landmark through navigation process and for establishing a landmark client account.

In a second embodiment of the landmark declaration method, a landmark place or region is declared while a user is physically navigating at a place or some area. With reference to FIG. 6, a procedure to declare a landmark at the landmark place is illustrated in accordance with one or more embodiments and is generally referenced by numeral 600. After the process starts 604 on a mobile type of client terminal device system using the information service system's application program, a user first loads landmark declaration application tool at 608 with onsite landmark definition mode selected. The onsite landmark definition modes comprise a manual definition mode and an automatic tracing mode for user selection at 612. In manual definition mode, a landmark location and shape are specified by manually setting up location points and a geometric shape based on the location points at 616. This method is typically used when the geometric shape of the landmark location is simple. Alternatively, in automatic tracing mode, the characteristic trace of a landmark is recorded while a user is navigating around the landmark place to be declared. The final landmark location and shape are then specified based on the connected characteristic traces to determine an enclosed region or a path trajectory at 620. After the landmark location is clearly specified, the rest of landmark declaration at 624, registration at 624, configuration at 628 and management at 632 processes can be achieved the same as these processes in steps at 516, 524, 528. Once finished, other operations will continue at 636.

Figure 7:
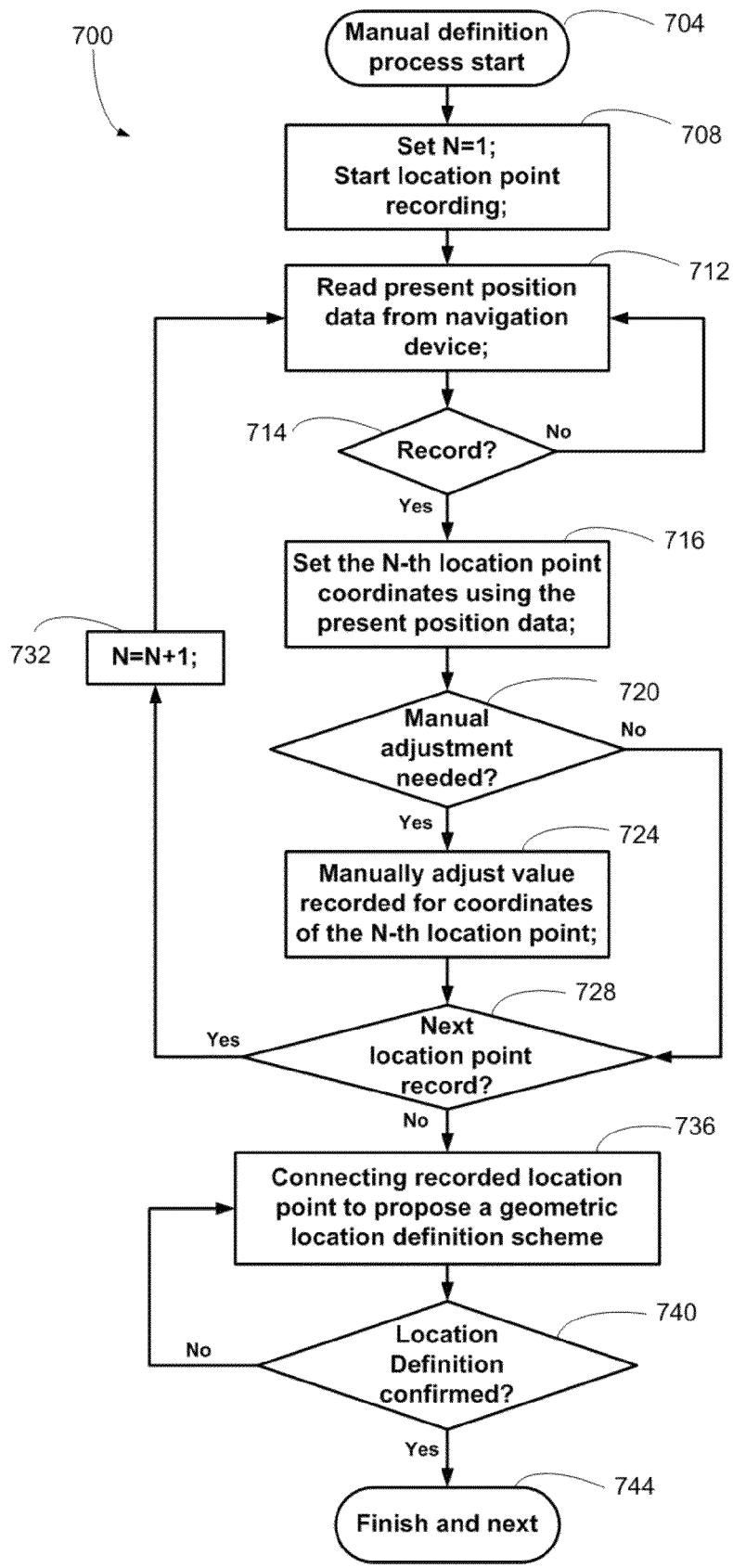
FIG. 7 is a flowchart illustrating a method for landmark declaration through navigation in manual mode according to one or more embodiments.

With reference to FIG. 7, a procedure to manually define a landmark location in navigation method is illustrated in accordance with one or more embodiments and is generally referenced by numeral 700. After the manual definition process starts at 704, the location point index number N is set to 1 at step 708. The definition process will start by reading the present position data from the navigation device of a user client terminal device system at 712 while a user client is moving around a desired landmark place. It is important to point out at step 712, the present position reading at a time can be done for a plurality of location points from multiple navigation devices. When the user decides to record a present position as a location point at 714, the N-th indexed location point will be specified with coordinates of the present position at 716. Otherwise, the navigation process will continue with step 712 until a record command is received from the user. After a location point is specified, its coordinates can be further adjusted at 724 if needed 720. For example, the true landmark place may need to be 10 meters to the north of the present location point. For another example, the true landmark place may need to be 100 meters above the place where the user stands at. After that, the definition process will ask the user if more location point is needed to shape the landmark location at 728. If needed, the location point index N will be increased by 1 to indicate the next location point record at 732 and the process will repeat the steps from 712 to 728. After all the location points are recorded, the process goes to step 736, where the landmark location and shape will be finalized. A first scheme for landmark location and shape can be achieved by connecting the landmark location points sequentially. If not satisfied, a user can finely tune the location and shape definition manually or ask for a new definition proposal based on the recorded location points. After a base location definition and shape is determined, the user can further adjust the landmark location definition by adding offsets, additional shape, envelop shape based on the base definition. The process continues until a final landmark location and shape definition is confirmed by the user at 740. The process will finish and continue with other operations at 744.

Figure 8:
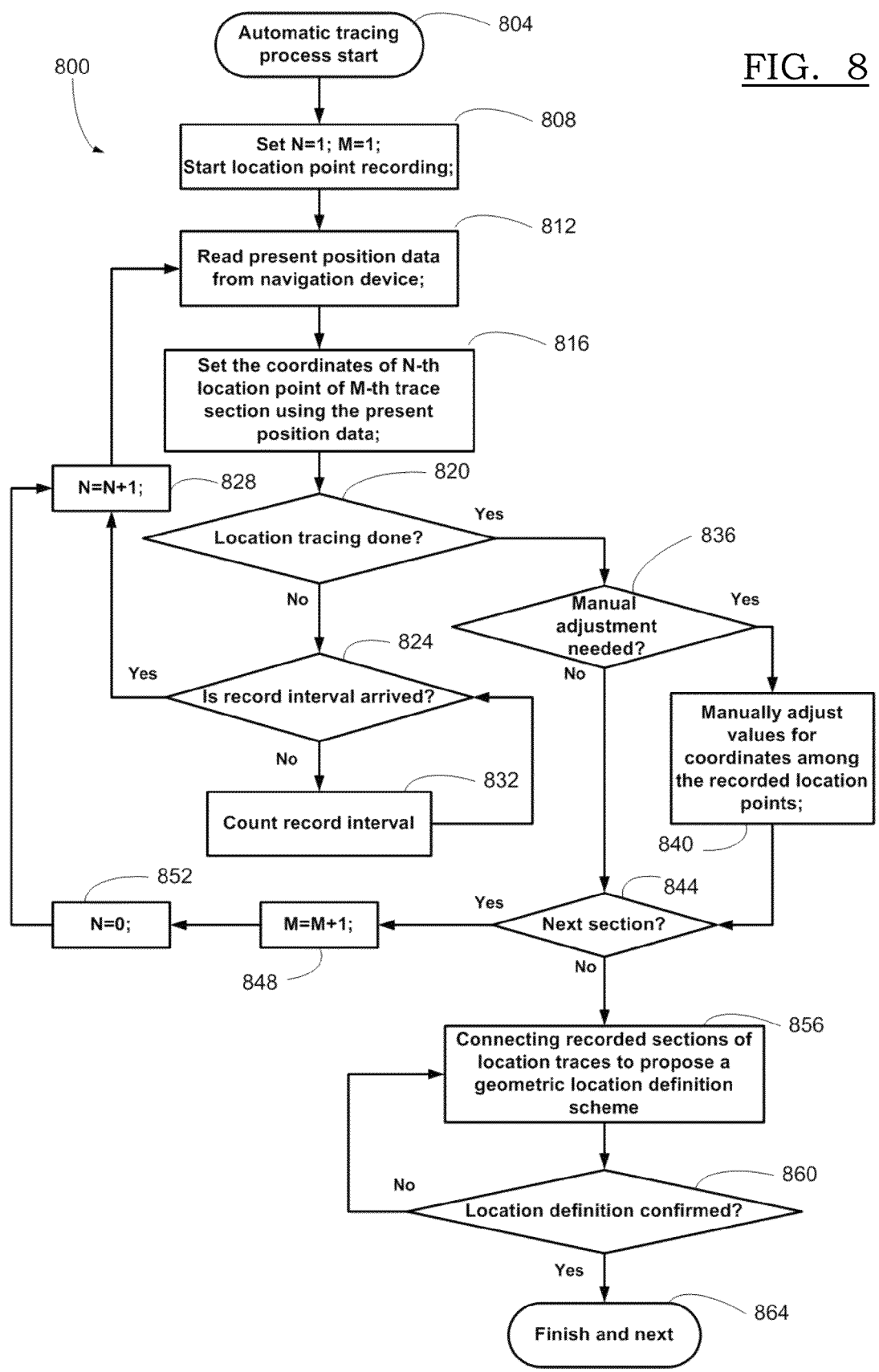
FIG. 8 is a flowchart illustrating a method for landmark declaration through navigation in automatic tracing mode according to one or more embodiments.

With reference to FIG. 8, a procedure to automatically trace a landmark location in navigation method is illustrated in accordance with one or more embodiments and is generally referenced by numeral 800. After the automatic tracing definition process starts at 804, the location point index number N is set to 1 and the trace index number M is set to 1 at step 808. The present position data are obtained from the navigation device while a user is moving around a desired landmark place at 812. The first location point of the first trace section is set by present coordinates when the process starts at 816. While the user is moving, the process first check if the location tracing is determined done by the user at 820. If not, a certain interval criterion is used to trigger the automatic location point recording. Typically used interval criteria include time interval and distance interval between consecutive location point records. Once a record interval is arrived at 824, for example 5 meters passed since last record, the process will move to the next record index by N=N+1 at step 828 and to repeat the steps from 812 and 816 to record a new location point. Otherwise, the interval will keep counting up at 832 until an interval criterion is satisfied at 824.

After a location tracing is done at 820, the process will check with the user to see if manual adjusts on the recorded location point coordinates is needed at 836. If needed, adjustment on certain recorded location points will be carried out at 840. If not needed or after the adjustment is done, the process will check if further trace section is needed to finish the landmark location and shape specification. If needed, the trace index number M will be added by one to start the next trace section recording at 848 with N=0 set at step 852 such that the recorded location can start with the first location point for the M-th trace section. The process will repeat from step 828 until finishing recording all the necessary trace sections at 844. Similar to steps 736 and 740, steps in 856 and 860 work on finalize the landmark location and shape definition with different manually specified and automatically proposed connection schemes. The base trajectory and shape can further be extended to define advanced landmark places. For example, a recorded trace is a trajectory and a final landmark location and shape is a path with additionally specified path width and direction. For another example, the recorded traces connect to enclose an area and a final landmark location and shape is a 3D space above the area with location height set to a certain altitude. The automatic tracing landmark declaration ends with other operations at 864.

The location and shape specification for a dynamic landmark client frequently comprises the usage of the navigation based landmark definition method to update its identifying location attributes. Furthermore, the location and shape of a dynamic landmark client can also be specified with respect to the movement of some object or by a certain prescribed variation rules depending on time and other conditions.

Other than the two primarily used methods, there are many other ways for landmark declaration and landmark client definition. Among them, a first landmark declaration method declares a landmark by directly specifying its location and shape coordinates to identify where it is and how it shapes. Second, a landmark place can be specified based on existing landmarks. An already defined landmark will be used as the base to define a new landmark. The new landmark can be the same to the existing one or it can be modified based on the existing one. Third, a landmark place can be specified using existing landmarks. This is mostly used for defining group landmarks. Forth, the landmark declaration can be made using a mix of the methods described above.

After the definition of a landmark client, a landmark client account can be registered for the defined landmark client. A landmark client account is an information resource that contains the information, records and applications associated to a landmark client as well as to its extended client terminal device systems. The definition of a landmark client and the registration for a landmark client account include the specifications of landmark identity and account configurations.

A landmark client account has its identity attributes comprising name, type, location and shape, social and organization relationship, category, etc. Multiple landmarks account can be registered for a same landmark but each of these landmark client accounts has its unique identity attributes. Landmark client account name is a word or term used for identification. It usually can identify a class or category of the landmark client account. Different types of landmark accounts can be registered for landmark clients based on their expected usage and information services. Exemplary account types comprise: 1). basic information account that is used for information posting and sharing; 2). Interactive information account that supports information posting and information contribution from user clients; 3). Information and control account that provides additional control methods to access client terminal device systems beyond an interactive information account; 4). group account that is defined by a combination of other accounts or it is an account with links to access other accounts; 5). hyper account that have the right to access to the information, management and control of other accounts; 6). dynamic account of any of the previous types that allow varying attributes of identifying location and shape. A dynamic landmark client account requires client terminal device system 250 connected to the service center system 86 to locate the landmark.

Landmark location and shape attribute specifies the place where the landmark client resides and how this place geometrically looks like. The location and shape specification data are also used in relationship evaluations between the landmark client and other clients. Landmark client's social and organization relationship specifies its hierarchical membership relation to other client accounts or to social societies, organizations, activity events and some objects that associate groups of clients.

Landmark category specifies classes of landmarks regarded as having particular shared characteristics in their identity, function, service, size, etc. Exemplary categories include: food service, grocery, hospital, government agency, parking place, school, theme park, company with more than 1000 employees, etc. A landmark client can have multiple category identities. The category attribute can be organized with a hierarchical structure of multilayer and networks of classifications.

A landmark client account has its configuration attributes comprising client authority, system and method, relationship, etc. In the client authority attribute, different sets of authorized information and applications are itemized. Each set contains a portion of information and applications that can be allowed together for service user clients to access. Client authority attribute also have many defined permissible information and application classes. Each of them restricts the acceptable information and applications from user clients to be belonging to a certain class. A number of client authority types are itemized for the client authority attribute of a client account configuration. For example, a base authority type authorizes access to all the information and applications on the landmark client account by service user clients. For another example, among authority types specified by a restaurant landmark client, one authority type authorizes user clients' access to information and applications that relate to restaurant menu, daily special and promotion information. Under the same authority type, information and application contribution from user clients are limited only to the class of customer reviews. All specified client authority types on a client account are further ranked based on their scope of information and application coverage. The highest ranked authority type has the largest scope of authorized accessibility to information and applications while having the minimal level of restrictions on them.

System and method attribute contains a number of defined usage types. Each of the usage type contains a set of methods and functions for information processing and application execution. It further specifies on classes of methods and functions that are allowed from other clients.

Relationship attribute defines the necessary conditions that need to be satisfied in relationship situations. The terms of relationship comprise social relationship, spatial relationship, time relationship, environmental relationship and behavioral relationship.

Social relationship circumstances specify classes and societies of client accounts that a user client is required to associate to. For one example, a base social relationship circumstance is all the users. Other exemplary social relationship circumstances includes: group of user clients that are registered with the landmark client account; group of user clients that are residents of a city; group of user clients that are small business owner; group of tourist user clients; etc.

Spatial relationship circumstances define the conditions how the position of a user client is required to be in relation to the landmark place or to some other known places or objects. Exemplary spatial relationship circumstances include: inside the landmark place; 10 km away from the landmark place; on the north side of the landmark place; inside a branch location of the landmark client; within 10 meters to a sculpture; etc.

Time relationship circumstances defines the time instant or period conditions for client services or for other relationship circumstances to happen. For one example, a restaurant landmark specifies time relationship circumstance to be between 12 p.m. and 10 p.m. in order to provide promotion information to paired user clients. For a second example, a school landmark specifies time relationship circumstance to be within 1 hour after school dismissal to post students' activity information. For another example, a sport arena landmark specifies time relationship together with spatial relationship to be inside the landmark for longer than 2 hours for receiving promotion ticket information.

Environmental relationship circumstances define conditions requiring the presence of certain states of the environment, weather, infrastructure and traffic status, and the like.

Behavioral relationship circumstances define conditions requiring user clients to have in their behaviors as well as in their independent navigation motions or motions in relation to reference places and objects. Exemplary behavioral relation circumstances include: move at a speed above 70 mph; move north; enter a landmark place; move closer to a landmark place; turn left and stop; etc. Behavioral relationship circumstances are frequently expressed together with time relation circumstances.

Based on the detailed relationship terms, relationship conditions are constructed with each relationship condition combines a set of relationship circumstances that need to be satisfied concurrently. Each of the relationship condition is expressed using the following format: {for <social relation circumstance i>, require the fulfillments of <spatial relation circumstance j> and <time relation circumstance k> and <environmental circumstance l> and <behavioral relation circumstance m>}. In this bracketed formula, variables i, j, k, l, m are indexing parameters that take numerical values of (1, 2, 3, 4. . . . ). More specifically, social relation circumstance i indicates the i-th social relation circumstance defined. Other index parameters are similarly defined.

For example, a library landmark client has the following relationship condition specified: {for <student user clients enrolled in course Math 700>, require the fulfillments of <inside the landmark place> and <during weekday> and < > and <stay inside for more than 20 minutes>}. In this example, the < > indicates no relation circumstance needed for environmental relationship.

In relationship conditions, any of the relationship terms can have multiple instances in either AND or OR logic operation. For the hotel landmark by a freeway example used in paragraph [0038], a relationship condition is specified as: {for <heavy duty truck user clients>, require the fulfillments of <inside the freeway> and <[between 4 p.m. and 10 p.m.] and [estimated arriving time is less than an hour]> and <[temperature less than zero Celsius] and [raining]> and <[speed higher than 60 mph] and [move in direction towards the hotel]>}.

A NO relationship and an ANY relationship are frequently used for relation circumstances. The NO relationship simply mean in no condition. It is used to prohibit accessing information and executing application for a set of information and applications. On the other hand, an ANY relationship is used when access to a set of information and applications can be granted with no restriction. For example, a user client has the following relationship condition specified: {for <local news provider landmarks>, require the fulfillments of <ANY>}, which means information and application from local news provider can reach the user client with no condition requirement. A blank relationship circumstance < > is usually regarded as <ANY> relationship. For a service user client who does not want to receive information from local grocery stores, the following relationship condition is specified: {for <local grocery stores>, require the fulfillments of <NO>}. For embodiments of information service systems that do not have certain configuration attribute for client accounts, they are the same as the presented embodiment of the invented information service system using <ANY> relationship for the missing configuration attribute.

Based on configured authority types, usage types and relationship condition, relationship situations can be formulated to specify target information services and methods that are provided by the landmark client to user clients under certain conditions. Each of the relationship situations has the following format: {given the satisfaction of <relationship condition p>, grant <authority type q> with <usage type r>}. In this bracketed formula, variables p, q, r are indexing parameters that take numerical values of (1, 2, 3, 4. . . . ). More specifically, relationship condition p indicates the p-th relationship condition defined.

For example, for the restaurant landmark in the example in paragraph [0037], the landmark client specifies the following two relationship situations. First, {given the satisfaction of <relationship condition p=1>, grant <authority type q=1> with <usage type r=1>}, where relationship condition p=1 further specifies that {for <ANY>, require the fulfillments of <within 1 kilometers range to the restaurant location> and < > and < > and < >}. The authority type q=1 states a set of information including menu, today's special and coupons. The usage type r=1 specifies <display on client terminal device system>. This relationship situation allows customer within 1 kilometer range to receive menu, daily special and coupon on their terminal device system connected to the information service system 86. Second, {given the satisfaction of <relationship condition p=2>, grant <authority type q=2> with <usage type r=2>}, where relationship condition p=1 further specifies that {for <ANY>, require the fulfillments of <inside the restaurant> and <longer than 30 minutes> and < > and < >}. The authority type q=2 states a set of information including customer reviews. The usage type r=2 specifies <add to the restaurant's landmark account>. This relationship situation allows customer to access the records of customer reviews on the restaurant client account to add new customer reviews on experienced food services while staying in the restaurant.

In relationship situations, any of the attribute terms can have multiple instances using either AND or OR logic operation. Furthermore, each relationship situation may have more than one pair of authority type and usage type. For example, an exhibition client landmark has the following relationship situation specified: {given the satisfactions of <[relationship condition p=1] and [relationship condition p=2]>, grant [<authority type q=1> with <usage type r=1>] and [<authority type q=2> with <usage type r=2>]}. The relationship condition p=1 states {for <exhibition organizer clients>, require the fulfillments of <ANY>} and the relationship condition p=2 states {for <exhibition participant clients>, require the fulfillments of <within 10 meters to the exhibition counter> and <during 12 p.m. to 4 p.m.> and < > and < >}. The authority type q=1 defines a set of text information related to an exhibited electrical appliance. The usage type r=1 specifies <display on client terminal device system>. The authority type q=2 defines a set of applications used to control the exhibited electrical appliance. The usage type r=2 specifies <execute on client terminal device system>. More specifically, the relationship situation specified by the exhibition client gives the exhibition organizer and qualified participants to access information related to the exhibited appliance as well as to operate the appliance from their client terminal device system.

A user client account stores user client related information, application and service records. It provides a medium through which user clients access the information services by connecting from a client terminal device system. A user client account is basically the same as a landmark client account except that is has different account types and it uses different method to specify location attributes.

User client account type comprises: 1). Anonymous user account where no account identity needed, used only for limited information exploring in the service system; 2). Basic user account with identity and configuration, used for information exploring, contribution and operations; 3). Advanced user account that supports higher priority and advanced functionalities; 4). Information and control account that provide control system and functions that can be accessed and operated by other clients; For example, a robot client that enables remote controls from a landmark client to achieve automated tasks; 5). Group account that is a combination of many user client accounts in order to have group identity and configuration to access services; 6). Hyper account with access to the information, management and control of other accounts.

A user client account, once active with a user client connecting to the service center system 86, has its location attribute updated to reflect its present position with respect to a coordinate system from the map database 34. The LRPS 38 on the service center system 86 receives navigation data from the user client terminal device system and updates the client account's location identity periodically or upon change. The service center system 86 also keeps a history record of client navigation data 62. A user client account can have its shape manually specified or use a default point shape. For user clients that require varying shape specification, their attribute specification and updating methods will be the same as those for dynamic landmark accounts.

The contents of a client account comprise three types of data. The first type includes information classes and their associated methods and operations. This includes the body of the information contents and the actions that can process the information contents. The second type includes management methods and records. This includes the actions that determine and change the data structure, organization, structure, architecture, hierarchy, classification, membership, account identity and configuration, etc. The third type includes applications and their associated methods to realize service functionalities, system controls and apparatus operations.

The information contents on a landmark client account can have a subject directly or indirectly related to the landmark client. Such information comprises data (in the format of symbol, text, message, audio or video records, figure etc.), controls (control and operation command, method, program, etc.), designs (in the format of flyer, album, advertisement, etc.), software application programs, and databases (like data library, forum, bulletin board, webpages, etc.). For example, a restaurant landmark can contain information about history of the restaurant, menu, today's specials and coupon in flyer, audio or video format. A bus station landmark contains information about the general bus schedule at this station, the next bus coming time and route, and interactive route planning program for connection selection. A speed control zone landmark contains operation commands that can directly or indirectly control the operations of vehicles running inside the covered regulation region such that certain speed limit will not be violated. Most information on the information service system can use uniformly defined standard formats for different types of information contents. By doing this, the client account maintenance and system usage obstacles are maximally minimized.

For example, a handyman service provider wants to broadcast the service coverage and give details about its type, history, price, available service time, updates and confirmation about appointments, etc. The handyman service provider can declare his/her office as a landmark and add the information be broadcasted to the registered landmark client account. On the same landmark account, paired service user client can add information to this landmark account. Such information can relate to the service request, appointment confirmation, customer reviews, etc.

For another example, a person can declare a landmark on his/her own house. When certain service is needed from the place, like plumbing service, the landmark owner can post service request from his/her landmark account and the information will be broadcasted and exchanged from the landmark client account. On the other hand, a user or another landmark client, who is a service provider, can look around on a digital map or from the client terminal device system to look for certain type of service requested in region and contact the service request landmark owner to offer service when paired to each other.

Figure 9:
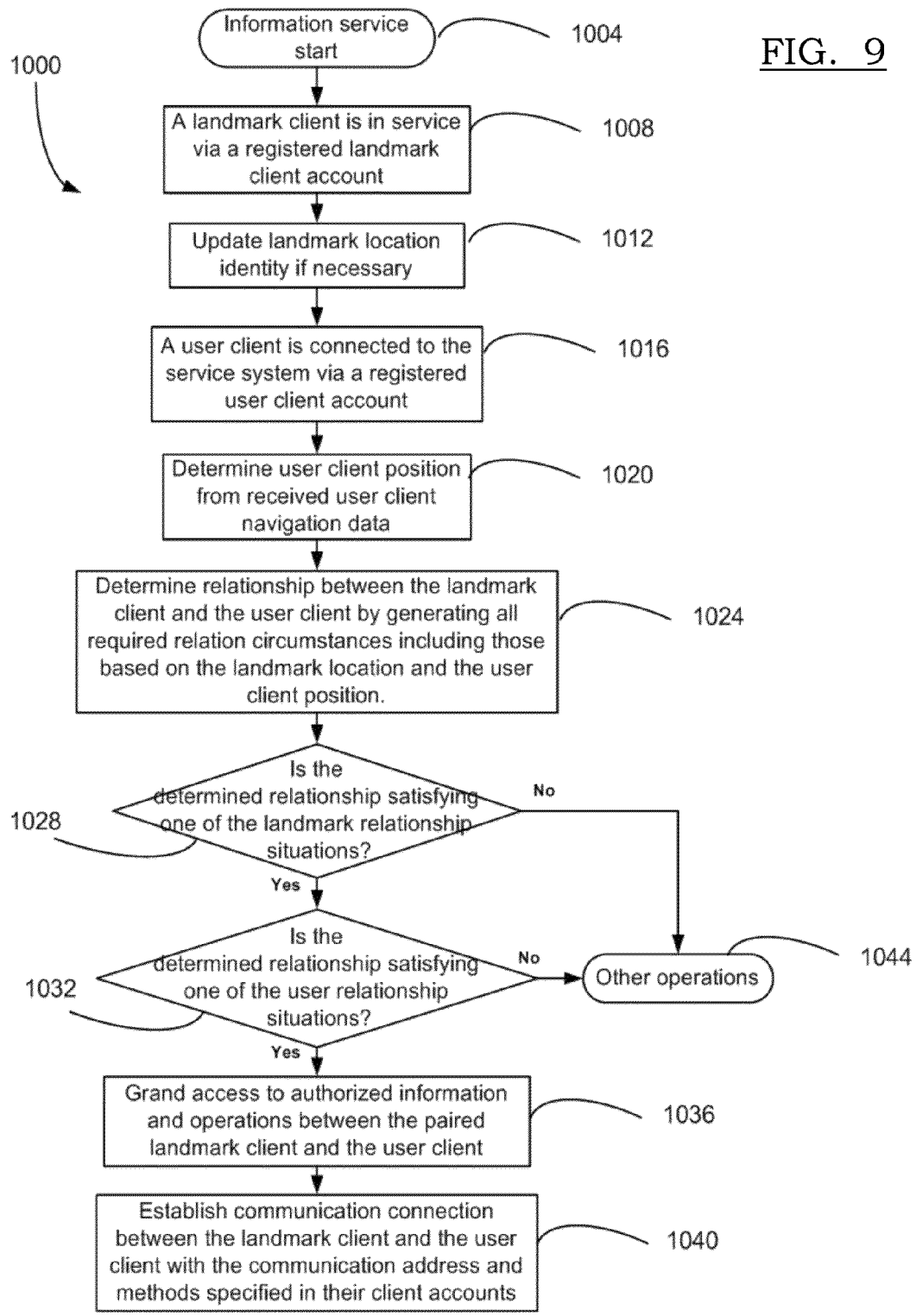
FIG. 9 is a flowchart illustrating a general procedure used from pairing a landmark client and a user client for information exchange and application services according to one or more embodiments.

With reference to FIG. 9, a general procedure used from pairing a landmark client and a user client for information exchange and application services is illustrated according to one or more embodiments and is generally referenced by numeral 1000. After the process starts 1004 on the information service system, the service application will update the identifying location attitudes if needed at step 1012 for a landmark account when the landmark client is in service 1008. For a user client connected to the information service system at 1016, the present position of the user client is determined from received navigation data at 1020. Next, the relationship between the landmark client and the user client is determined by generating all required relation circumstances including those based on the landmark location and the position of the user client at 1024. The service system then evaluate on whether the determined relationship satisfies at least one of the landmark relationship situations at 1028. The service system next evaluate on whether the relationship satisfies at least one of the user relationship situations at 1032. Once both evaluations are successful, access to authorized information and operations between the paired landmark client and the use client are granted at 1036. Connection for information exchange and application service will then established between the landmark client and the user client using the communication addresses and methods specified on both client accounts at 1040. On the other hand, if no satisfactory relationship situation is identified from either account at steps 1028 and 1032, no pairing result will be generated for the two clients and information system will continue with other operations at 1044.

Figure 10:
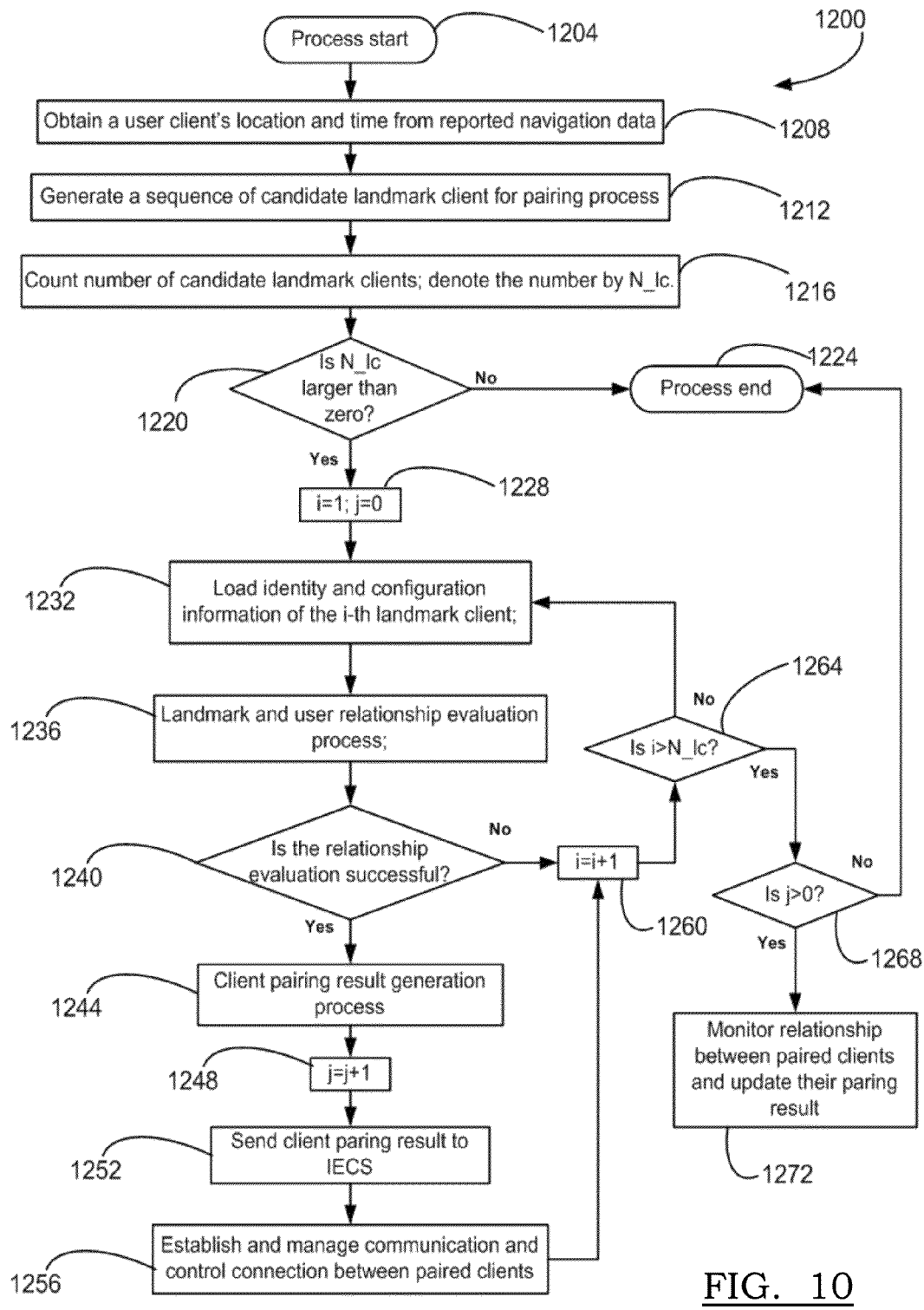
FIG. 10 is a flowchart illustrating a method for pairing landmark clients with a user client for information exchange and application services according to one or more embodiments.

With reference to FIG. 10, a method for preparing candidate landmark clients with a user client for information exchange and application services is illustrated according to one or more embodiments and is generally referenced by numeral 1200. For a user client connected to the information service system, after the process starts at 1204, the service system obtains the user client's location and time from its reported navigation data at 1208. Based on the user client's identity and location information, a sequence of candidate landmark client for paired information exchange and application services will be generated 1212. This step is regarded as a rough landmark screening process where candidate landmark clients are obtained by filtering conditions determined by the service center system 86 based on certain location, time and service category criteria. The total number of candidate landmark clients for pairing is counted and denoted by N_lc at 1216. If N_lc is not larger than zero as determined at 1220, the process will terminate at 1224. Otherwise, the pairing process will be initiated with i=1 and j=0 at 1228, where i is used to indicate the i-th candidate landmark client in pairing process and j is used to count the number of landmark client successfully paired with the user client. After the initialization step, the landmark client account identity and configuration data are loaded to the LRPS 38 at 1232 for the i-th landmark client in the candidate landmark client sequence. Then, the landmark and user relationship evaluation process starts at 1236. This process is further illustrated in details in FIG. 11. If the relationship evaluation is successful at 1240, the process will continue with client pairing result generation process at 1244 and the number of paired landmark client with the user client will count up with j=j+1 at step 248. The client paring result generation process at 1244 is further illustrated in details in FIG. 14. The client pairing result is next sent to IECS 82 at step 1252 to establish and manage communication and control connection between paired clients at 1256. When either the relationship evaluation fails in step 1240 or a successful client connection established at step 1256, the process will continue with relationship evaluation process at 1232 with the next i-th candidate landmark client by i=i+1 at 1260 until the value of i is larger than N_lc, which indicates all the candidate landmark clients have been evaluated for service paring process at 1264. After that, the service system will start monitoring the relationship and updating their paring results for the already paired clients at 1272. In the case where the final value of j is less than one, the process will terminate at 1224 since no successful pairing with landmark client is identified for the user clients at 1268.

Figure 11:
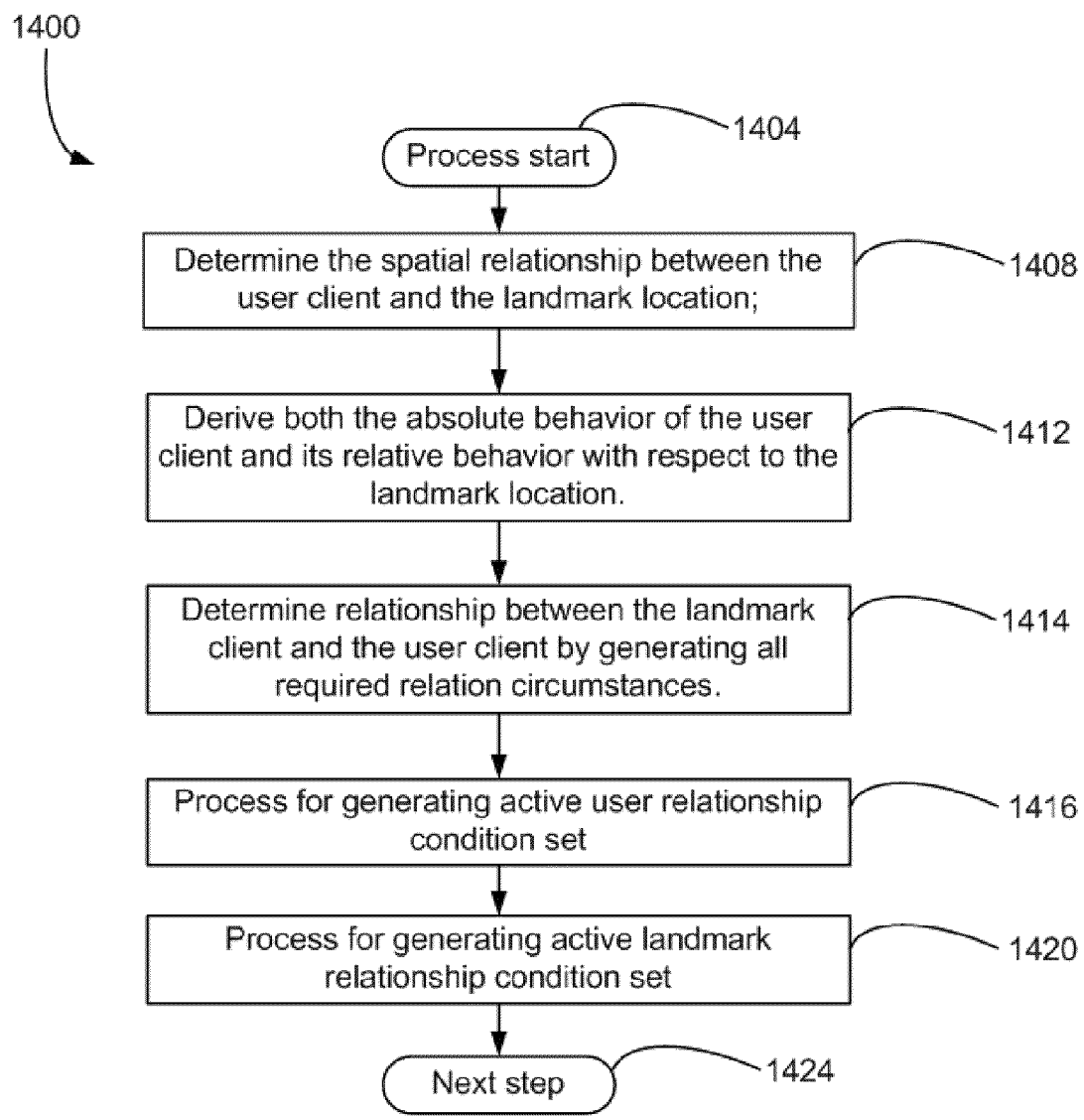
FIG. 11 is a flowchart illustrating a method for landmark and user relationship evaluation process according to one or more embodiments.

With reference to FIG. 11, the landmark and user relationship evaluation process is illustrated in details according to one or more embodiments and is generally referenced by numeral 1400. This landmark and user relationship evaluation process is used in step 1236 in the method 1200 as presented in FIG. 10. After the process starts at 1404, the service system determines the spatial relationship between the user client and the landmark location at 1408. The service system next derives both the absolute behavior of the user client and its relative behavior with respect to the landmark location at 1412. Next, the relationship between the landmark client and the user client is determined at 1414 by generating all required relation circumstances including those based on the determined spatial relationship determined at 1408 and derived behavior relationship at 1412. The process for generating active user relationship condition set is executed at 1416 and it is continued with the process for generating active landmark relationship condition set 1420. The service system then go to next step at 1424 and the landmark and user relationship evaluation process 1236 finishes.

Figure 12:
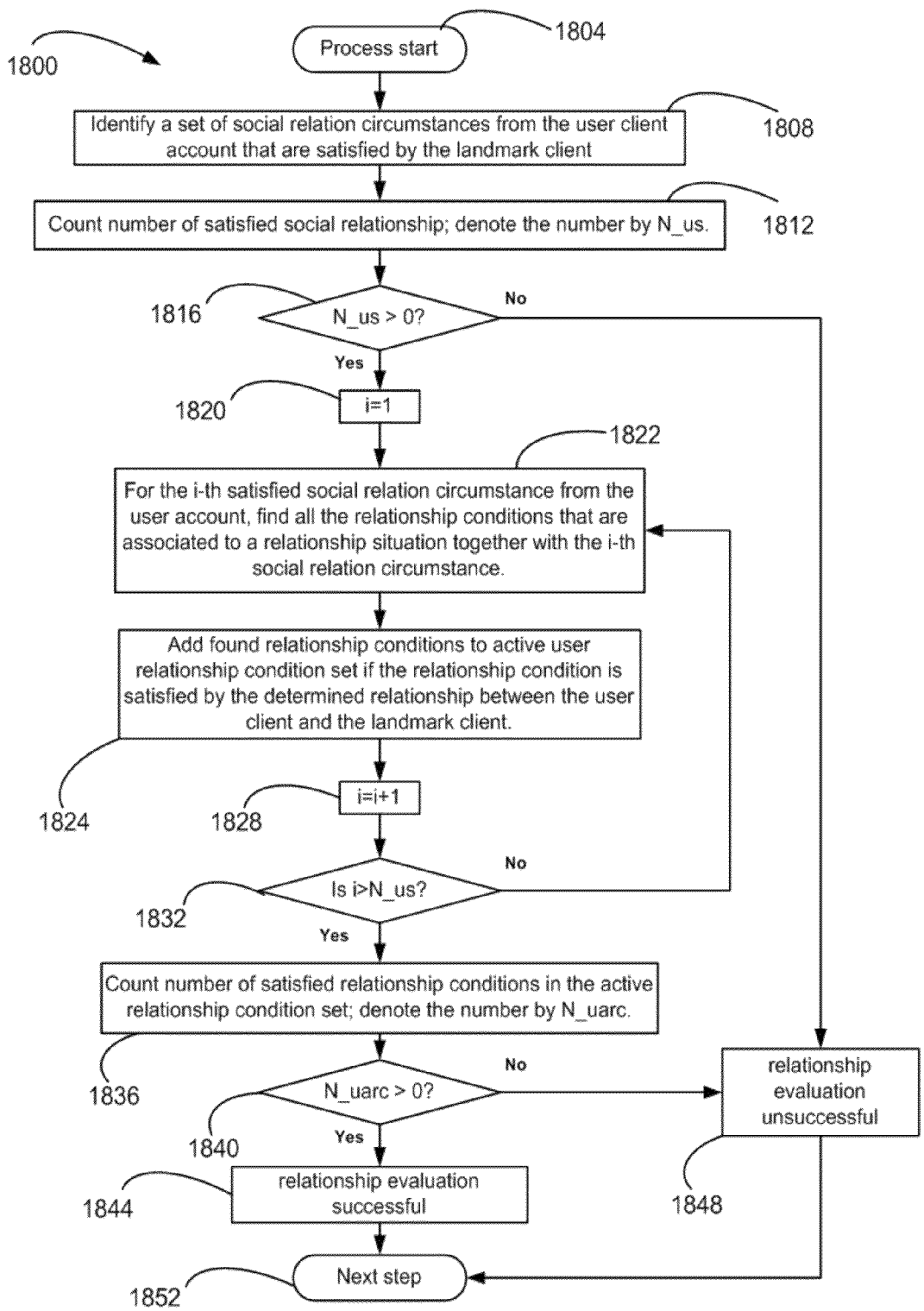
FIG. 12 is a flowchart illustrating a process for generating active user relationship condition set according to one or more embodiments.

With reference to FIG. 12, the process for generating active user relationship condition set at 1416 is further illustrated in details according to one or more embodiments and is generally referenced by numeral 1800. After the process starts at 1804, the service system first identifies a set of social relation circumstances from the user client account that are satisfied by the landmark client at 1808. The total number of satisfied social relationship circumstances are counted and denoted by N_us at 1812. At step 1816, if N_us<0, the relationship evaluation is unsuccessful at 1848 and then the process finish and go to other processes at 1852. Otherwise, the relationship evaluation continues by initializing i=1, where i is an index parameter indicating the i-th satisfied social relationship circumstance at 1820. For the i-th satisfied social relation circumstance from the user account, find all the relationship conditions that are associated to a relationship situation together with the i-th social relation circumstance at 1822. Among the found relationship conditions, those that are satisfied by the determined relationship between the user client and the landmark client are added to an active user relationship condition set at 1824. The service system continues to process step 1822 and step 1824 for the i+1-th social relationship circumstance at 1828 until finishing all N_us circumstances at 1832. After that, the total number of satisfied social relationship conditions are counted and denoted by parameter N_uac at 1836. If N_uac>0, that is, the determined relationship between the two clients satisfies at least one relationship condition that are specified in a user relationship situation at 1840. The user relationship evaluation is successful with an active user relationship condition set generated at 1844. If N_uac<=0, the relationship evaluation fails at 1848. The process will continue to next step 1852.

Figure 13:
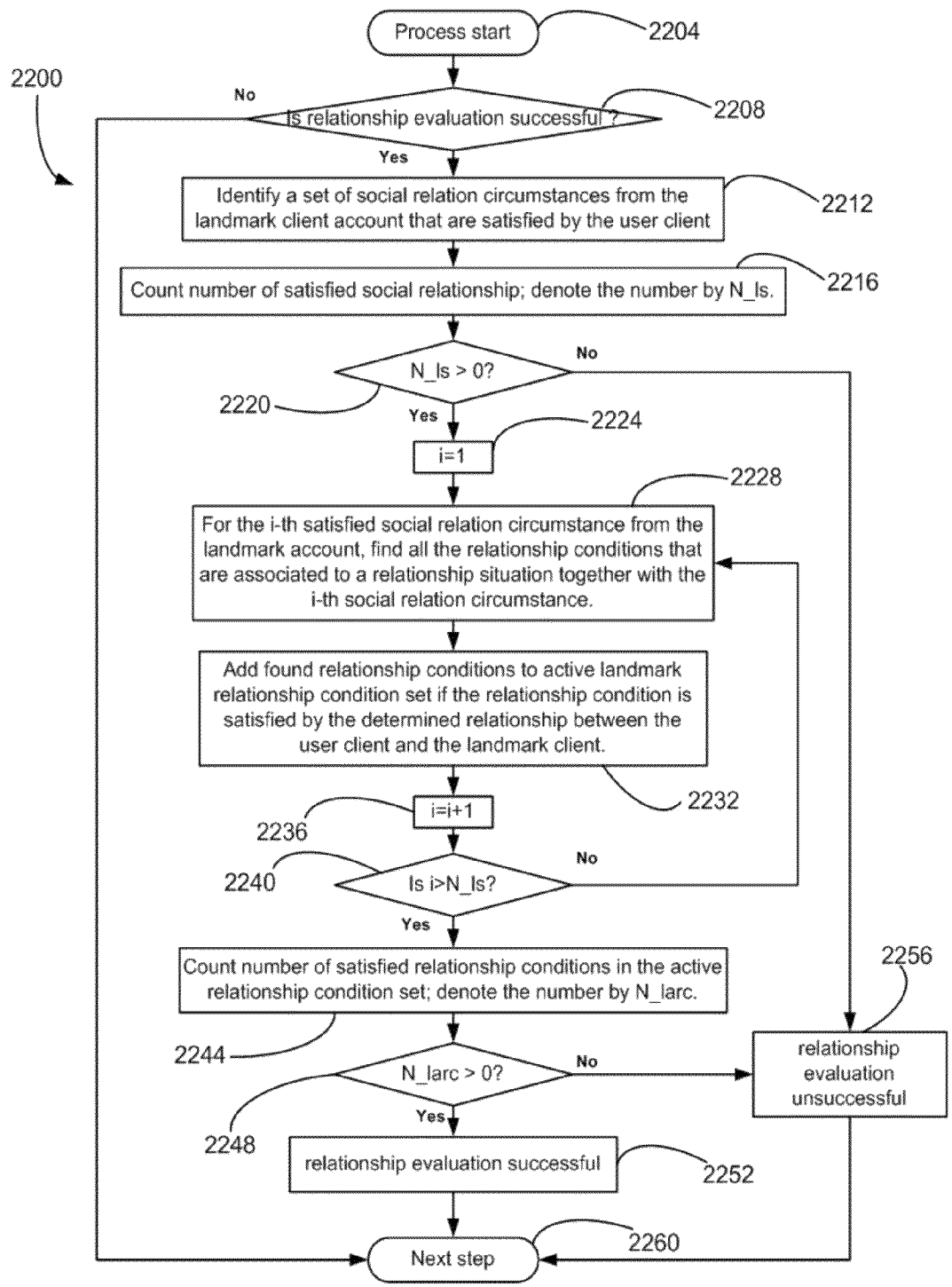
FIG. 13 is a flowchart illustrating a process for generating active landmark relationship condition set according to one or more embodiments.

With reference to FIG. 13, the process for generating active landmark relationship condition set at 1420 is further illustrated in details according to one or more embodiments and is generally referenced by numeral 2200. This active landmark relationship generation process is used in step 1420 in the process 1400 as presented in FIG. 11. After the process starts at 2204, the service system first checks at step 2208 if the relationship evaluation out of the last process 1800 has achieved successful result at step 1844 or not. If no successful evaluation is obtained from process 1800, the service system will bypass all the following process for landmark client relationship evaluation and go to following step with the unsuccessful evaluation result, which will be used at step 1240 in process 1200. If the user client relationship evaluation is successful with a non-empty active user relationship condition set, the service system will continue to evaluate the landmark relationship conditions at 2212, where a set of social relation circumstances from the landmark client account are identified. The user client satisfies any of the social relation circumstances in this set. The total number of satisfied social relation circumstances are counted and denoted by N_ls at 2216. If N_ls not larger than zero, which means no any landmark specified social relation circumstance is satisfied by the user client, the relationship evaluation fails at 2256 and the process goes to step 2260. Otherwise, the relationship evaluation continues by initializing i=1, where i is an index parameter indicating the i-th satisfied social relationship circumstance at 2224. For the i-th satisfied social relation circumstance from the landmark account, find all the relationship conditions that are associated to a relationship situation together with the i-th social relation circumstance at 2228. Among the found relationship conditions, those that are satisfied by the determined relationship between the user client and the landmark client are added to an active user relationship condition set at 2232. The service system continues to process step 2228 and step 2232 for the i+1-th social relationship circumstance at 2236 until finishing all N_us circumstances at 2240. After that, the total number of satisfied social relationship conditions are counted and denoted by parameter N_uac at 2244. If N_uac>0, that is, the determined relationship between the two clients satisfies at least one relationship condition that are specified in a landmark relationship situation at 2248. The user relationship evaluation is successful with an active user relationship condition set generated at 2252. If N_uac<=0, the relationship evaluation fails at 2256. The process will continue to next step 2260, which is connected by the step 1240 in the process 1200.

Figure 14:
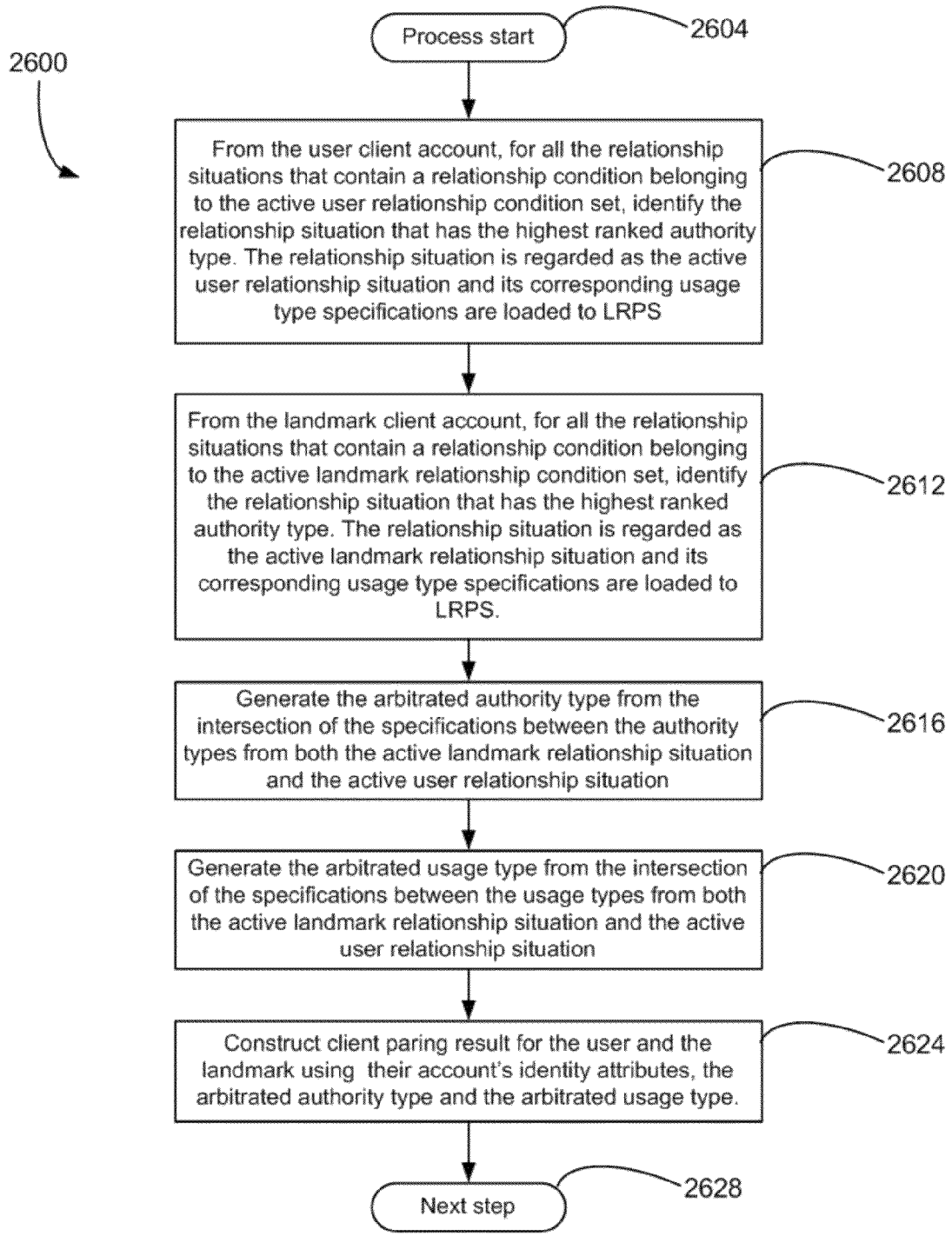
FIG. 14 is a flowchart illustrating a method for client pairing result generation process according to one or more embodiments.

With reference to FIG. 14, a method for client pairing result generation process is further illustrated in details according to one or more embodiments and is generally referenced by numeral 2600. This method is used at step 1244 in the method 1200 if the successful relationship evaluation between a landmark client and a user client has been achieved at steps 1236 and 1240. After the process start at 2604, from the user client account, the relationship situation that has the highest ranked authority type is identified by the service system among all the user relationship situations that contain a relationship condition belonging to the active user relationship condition set generated in process 1800. The relationship situation that has the highest ranked authority type is now called the active user relationship situation and its associated usage type specifications are then loaded to LRPS 38 at step 2608. A similar process to 2608 is repeated for the landmark client account at 2612 with the active landmark relationship situation identified and its associated usage type specifications loaded. After that, an arbitrated authority type is generated from the intersection of the specifications between the authority types of the active user relationship situation and the active landmark relationship situation at 2616. Similarly, an arbitrated usage type is generated at step 2620. The final client pairing result is then constructed for the user client and the landmark client including their accounts' identity attributes; the arbitrated authority type and the arbitrated usage type at 2624. The process next goes to step 2628, which is continued with step 1248 in the method 1200.

To better illustrate the client pairing method, several use cases are provided in the following sections for better understanding the novelty of the present invention in information service applications.

In the first use case, a service user client is driving a passenger vehicle up north on a freeway at a speed 70 mph at 4 p.m. The user client has the following relationship situation specified: {given the satisfaction of <relationship condition p=1>, grant <authority type q=1>with <usage type r=1>}, where relationship condition p=1 further specifies that {for <ANY>, require the fulfillments of <nearest in the driving direction> and < > and < > and <vehicle speed higher than 25 mph>}. The authority type q=1 states information <ANY>. The usage type r=1 specifies <[display text message on the dashboard] and [play audio message] and [play video and application only on the rear seat HMI]>. This relationship situation allows any landmark that is regarded nearest to the user client along its driving direction to reach the vehicle terminal device system. It further accepts any of information and application contents. But when its speed is higher than 25 mph, only text message can be shown on the dashboard area. Any video type of information or application can only use the HMI device for the rear seat passengers. Audio message can be played with no restriction.

Along the freeway, sections of the road are declared as advertising landmarks whose accounts containing text, audio and video advertisement messages. One of such landmark client has the following relationship situation specified: {give the satisfaction of <relationship condition p=1>, grand <ANY> with <ANY>}; The relationship condition p=1 further states: {for <ANY>, require the fulfillments of <within the landmark> and < > and < > and <[in the north direction] and [speed between 45 mph and 75 mph]>}; When the user client is entering the section of road declared by the advertising landmark client, successful pairing between the clients is determined by LRPS 38. After that, the advertising information will be transmitted from the landmark client account to the user's vehicular terminal device system. The text advertisement will reach the dashboard for display and a advertising movie will be played on the HMI in front of the rear seats. For example, a local McDonald's restaurant advertises recent menu specials, coupons, and a greeting video message from the staff team. The user client gets to know nearby food service, hotel, doctor clinic, insurance agent, antique market, etc. while driving through sections of the freeway.

A company resides by the freeway declares its location as a landmark client. The company landmark has the following relationship situations specified: {give the satisfaction of <relationship condition p=1>, grand <authority type q=1> with <usage type r=1>} and {give the satisfaction of <relationship condition p=2>, grand <authority type q=2> with <usage type r=1>}; The relationship condition p=1 further states: {for <passenger vehicles>, require the fulfillments of <[within the freeway] and [1 kilometer to the landmark]> and <between 8 a.m. and 6 p.m.> and < > and <speed between 45 mph and 75 mph>}; The authority type q=1 states a set of information <company introduction>. The usage type r=1 specifies <[display text message] and [play movie]>. The relationship condition p=2 further states: {for <heavy duty vehicles>, require the fulfillments of <[within the freeway] and [5 kilometer to the landmark]> and <between 8 a.m. and 6 p.m.> and < > and <speed between 35 mph and 55 mph>}; The authority type q=2 states a set of information <trucking product introduction>. When the user client is driving by the company site in 1 kilometer range, it is successfully paired with the company landmark client to learn knowledge about this company including its history, main product, customer relationship and services from received message and movies. Similarly, towns and counties declare their regions as landmark and such towns and counties landmarks cover many road sections. When no other landmark is paired with the user client for information services, the local town and county landmark will get connected to introduce the history, landscape, point of interest and people in the local township and county. A user client has the opportunity to learn a lot of knowledge about geographic regions while driving along roads crossing them.

The freeway itself is declared as a landmark along its road trajectory and it has the following relationship situation specified for its client account: {given the satisfaction of <relationship condition p=1>, grant <authority type q=1> with <usage type r=1>}, where relationship condition p=1 further specifies that {for <ANY>, require the fulfillments of <within the freeway> and < > and < > and <speed higher than 85 mph>}. The authority type q=1 states information <message: speeding warning>. The usage type r=1 specifies <[display text message] and [play audio message]>. Given that the user client driving on the freeway at a speed higher than 85 mph, the user client will be paired with the freeway client to have speeding warning messages transmitted to the driver. Another relationship situation specified by the freeway is: {given the satisfaction of <relationship condition p=2>, grant <authority type q=2> with <usage type r=1>}, where relationship condition p=2 further specifies that {for <ANY>, require the fulfillments of <[within the freeway] and [reaching a bridge in 10 minutes]> and < > and <temperature less than 5 degree Celsius> and <speed higher than 45 mph>}. The authority type q=2 states information <message: ice warning on bridge, reduce speed>. Given a user client driving on the freeway at a speed higher than 65 mph in a cold winter day at −10 degree Celsius, the user client will be paired with the freeway client before reaching the bridge to receive the alerting message.

The freeway landmark client further has a control system controlled by its landmark terminal device system. The control system is a road light control system that controls the lighting function of road lights along sections of the freeway. The landmark has the following relationship situation specified: {given the satisfaction of <relationship condition p=3>, grant <authority type q=3> with <usage type r=3>}, where relationship condition p=3 further specifies that {for <ANY>, require the fulfillments of <inside the landmark> and <between 5 p.m. and 6 a.m.> and < > and < >}. The authority type q=3 states application <road light control application>. The usage type r=3 specifies <[switch the road lights 500 meters before user client location to high illumination mode] and [switch the road lights 100 meters after user client location to high illumination mode] and [keep the road lights in low illumination mode otherwise]>. A user client driving on the freeway at 9 p.m. has the following relationship specified: {given the satisfaction of <relationship condition p=2>, grant <authority type q=2> with <usage type r=2>}, where relationship condition p=2 further specifies that {for <transportation landmark>, require the fulfillments of <nearest in the driving direction> and < > and < > and < >}. The authority type q=2 states information <present position>. The usage type r=2 specifies <allow access>. The user is paired with the freeway landmark client based on their relationship situations satisfied. The landmark client obtains the user's navigation position information to generate its control command to its associated road light control system. While driving at night, sections of road that have user clients detected on them will be fully lighted while the rest of the road sections can be kept dim to reduce energy cost.

The freeway landmark client also provides service applications that can be used by user clients. For example, a service application is an emergency reporting service. The landmark has the following relationship situation specified: {given the satisfaction of <relationship condition p=4>, grant <authority type q=4> with <usage type r=4>}, where relationship condition p=4 further specifies that {for <ANY>, require the fulfillments of <along the landmark in 1 kilometer width range> and < > and < > and < >}. The authority type q=4 states application <emergency reporting service>. The usage type r=4 specifies <usage>. A user client driving on the freeway has the following relationship specified: {given the satisfaction of <relationship condition p=3>, grant <authority type q=3> with <usage type r=3>}, where relationship condition p=3 further specifies that {for <transportation landmark>, require the fulfillments of <nearest> and < > and < > and < >}. The authority type q=3 states <applications>. The usage type r=3 specifies <download and usage>. When an accident is observed by a user client on the freeway, the user client can download and run the emergency application for the freeway landmark account already paired. After that, the user can contact the local 911 center and hospital to report the accident based on its location. The user can further upload recorded video about the accident using the emergency reporting service functions.

In the second use case, a regulatory speed control zone landmark is declared over a region where no vehicle can driver at speed higher than 35 mph during 3 p.m. to 5 p.m. The landmark has the following relationship situation specified: {given the satisfaction of <relationship condition p=1>, grant <authority type q=1> with <usage type r=1>}, where relationship condition p=1 further specifies that {for <ANY>, require the fulfillments of <inside the landmark> and <between 3 p.m. and 5 p.m.> and < > and <crossing>}. The authority type q=1 states information <message: speed limit restriction to below 35 mph>. The usage type r=1 specifies <[display text message at heighted mode] and [play audio message every 5 minutes]>. Given that a user client is crossing the speed control zone, the user client is paired with the speed control zone client based on its relationship situation specified: {given the satisfaction of <relationship condition p=1>, grant <authority type q=1> with <usage type r=1>}, where relationship condition p=1 further specifies that {for <regulatory zones>, require the fulfillments of <inside> and < > and < > and < >}. The authority type q=1 states information <ANY>. The usage type r=1 specifies <[display text message]>. After that, a speed limiting message will be displayed in highlighted mode to warn the driver in speed control. A second relationship situation specified by the speed control zone is: {given the satisfaction of <relationship condition p=2>, grant <authority type q=2> with <usage type r=2>}, where relationship condition p=2 further specifies that {for <vehicles with advanced adaptive cruise control function>, require the fulfillments of <inside the landmark> and <between 3 p.m. and 5 p.m.> and < > and <crossing>}. The authority type q=2 states an operation <speed upper limit at 35 mph>. The usage type r=2 specifies <set parameter value to advanced adaptive cruise control function>. The advanced adaptive cruise control function on a vehicle allows external parameter set to the vehicle controller in its speed regulation controls. Given a user client's terminal device system is on a vehicle equipped with the function, the user client has relationship situation specified: {given the satisfaction of <relationship condition p=1>, grant <authority type q=1> with <usage type r=1>}, where relationship condition p=1 further specifies that {for <regulatory zones>, require the fulfillments of <inside> and < > and < > and < >}. The authority type q=1 states information <external vehicle control parameters>. The usage type r=1 states <apply to target vehicle control function>. When driving inside the speed control zone, the upper limit parameter for speed control regulation of the user's vehicle will be set to 35 mph once the user client is paired with the speed control zone client. After that, the vehicle will no able to drive faster than 35 mph in normal driving mode until leaving the speed control zone.

In the third use case, a marathon event is declared as a landmark client. The marathon event is holding on a public road section with dynamic location and shape identity attributes defined by a sequence of location points along the roads. This sequence of location points are reported from several vehicles spreading from the road point before the leading runners to the road point after the last runner. The landmark client specifies relationship situations like: {given the satisfaction of <relationship condition p=1>, grant <authority type q=1> with <usage type r=1>}, where relationship condition p=1 further specifies that {for <ANY>, require the fulfillments of <[near the landmark in 1 kilometer width range] or [place within 1 hour reaching time]> and <during the marathon event> and < > and < >}. The authority type q=1 states application <marathon event information and status>. The usage type r=1 specifies <use event reporting application>. A user client stays next to a section of road that will be passed by the marathon event in 45 minutes has its relationship situation specified: {given the satisfaction of <relationship condition p=1>, grant <authority type q=1> with <usage type r=1>}, where relationship condition p=1 further specifies that {for <local event>, require the fulfillments of < > and < > and < > and < >}. The user accepts connection to any local events and the marathon landmark will be paired with it since it is expected that the event will pass through a road section in 45 minutes. Once connected, the user can use the application loaded from the landmark client account to learn the event and to monitor the present status of the event as well as to get runners' information.

As demonstrated by the embodiments described above, the methods and apparatus of the present invention provide advantages over the prior art by networking information resource and information users through their location and relationship correlations.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A method for controlling access to information and applications between two clients of an information service system comprising:
   creating a first client account for a first client for storing information and applications;
   creating a second client account for a second client for using said information service system;
   forming at least one first relationship situations for said first client account, wherein each of said first relationship situation associates a set of information and applications with a first relationship condition;
   forming at least one second relationship situations for said second client account, wherein each of said second relationship situation associates a permissible class of information and applications with a second relationship condition;
   determining client location for each of said first client and said second client;
   determining a relationship between said first client and said second client wherein said relationship comprising relation circumstances generated based on the determined locations of said first client and said second client;
   for said first client account, verifying said relationship satisfies at least one of said first relationship situations for which access to said associated set of information and applications is authorized by satisfying said first relationship condition associated to said at least one of the first relationship situations;
   for said second client account, verifying said relationship satisfies at least one of said second relationship situations for which access to said associated class of information and applications is permitted by satisfying said second relationship condition associated to said at least one of the second relationship situations;
   establishing information service connection between said first client and said second client; and
   permitting said second client to access said first client account for services on information and applications that belong to both the authorized set and the permissible class.

2. The method of claim 1, wherein one of said first client and said second client is a landmark client and one of said first client account and said second client account is a landmark client account with identifying location attribute defined by a declared landmark.

3. The method of claim 2, wherein the client location for said landmark client is determined by retrieving said identifying location attribute of said landmark client account.

4. The method of claim 2, wherein said landmark client account has client identity comprising at least one attribute from a set of attribute terms including name attribute, type attribute, location attribute, social relationship and organization attribute, and category attribute; and wherein said location attribute for said landmark client account comprises the declared location and shape of the landmark client.

5. The method of claim 1, wherein one of said first client and said second client is a user client and said one of said first client account and said second client account is a user client account, wherein said user client gets access to said information service system using a client terminal device system.

6. The method of claim 5, wherein the client location for said user client is determined based on received navigation data from said client terminal device system.

7. The method of claim 6, wherein said user client account has client identity comprising at least one attribute from a set of attribute terms including name attribute, type attribute, location attribute, social relationship and organization attribute, and category attribute; and wherein said location attribute for said user client account comprises the determined location of said user client.

8. The method of claim 1, wherein said first client account or said second client account has configuration comprising at least one attribute from a set of attribute terms including client authority attribute, system and method attribute, relationship attribute.

9. The method of claim 8, wherein said relationship attribute of said first client account comprises at least one said first relationship condition; and said relationship attribute of said second client account comprises at least one said second relationship condition; and wherein each of said first relationship condition and said second relationship condition comprises a set of relationship terms including social relationship, spatial relationship, time relationship, environmental relationship and behavioral relationship.

10. The method of claim 9, wherein said each of said first relationship condition and said second relationship condition define a set of relation circumstances to be satisfied comprising at least one circumstance from said set of relationship terms.

11. The method of claim 1, wherein said first client or said second client comprises a plurality of clients; and wherein the method further comprising:
creating and managing a plurality of landmark client accounts, each landmark account has unique landmark identity attributes with identifying location attribute defined by at least one stationary or dynamic landmark; and
creating and managing a plurality of user accounts, each user account is used by at least one user client to access information services from at least one client terminal device system.

12. The method of claim 1, wherein said first client or said second client has client terminal device system to execute said services on information and applications.

13. The method of claim 1, wherein said determining a relationship between said first client and said second client further comprises:
receiving and storing client navigation data to keep a navigation history record for at least one of said first client and said second client;
determining the client navigation behavior and motion based on received navigation data and said navigation history record for at least one of said first client and said second client;
determining a relationship between said first client and said second client, wherein said relationship comprising relation circumstances generated based on said client navigation behavior and motion of at least one of said first client and said second client.

14. A system for controlling access to information and applications between two clients of an information service system comprising:
memory, configure to store a program of instructions;
at least one processor operably coupled to said memory and a communication network, configured to execute said program of instructions, wherein when said program of instruction is executed, carries out the steps of:
creating a first client account for a first client for storing information and applications; creating a second client account for a second client for using said information service system;
forming at least one first relationship situations for said first client account, wherein each of said first relationship situation associates a set of information and applications with a first relationship condition;
forming at least one second relationship situations for said second client account, wherein each of said second relationship situation associates a permissible class of information and applications with a second relationship condition;
determining client location for each of said first client and said second client;
determining a relationship between said first client and said second client wherein said relationship comprising relation circumstances generated based on the determined locations of said first client and said second client;
for said first client account, verifying said relationship satisfies at least one of said first relationship situations for which access to said associated set of information and applications is authorized by satisfying said first relationship condition associated to said at least one of the first relationship situations;
for said second client account, verifying said relationship satisfies at least one of said second relationship situations for which access to said associated class of information and applications is permitted by satisfying said second relationship condition associated to said at least one of the second relationship situations;
establishing information service connection between said first client and said second client; and
permitting said second client to access said first client account for services on information and applications that belong to both the authorized set and the permissible class.

15. The system of claim 14, wherein one of said first client and said second client is a landmark client and one of said first client account and said second client account is a landmark client account with identifying location attribute defined by a declared landmark.

16. The system of claim 15, wherein the client location for said landmark client is determined by retrieving said identifying location attribute of said landmark client account.

17. The system of claim 15, wherein said landmark client account has client identity comprising at least one attribute from a set of attribute terms including name attribute, type attribute, location attribute, social relationship and organization attribute, and category attribute; and wherein said location attribute for said landmark client account comprises the declared location and shape of the landmark client.

18. The system of claim 14, wherein one of said first client and said second client is a user client and said one of said first client account and said second client account is a user client account, wherein said user client gets access to said information service system using a client terminal device system.

19. The system of claim 18, wherein the client location for said user client is determined based on received navigation data from said client terminal device system.

20. The system of claim 19, wherein said user client account has client identity comprising at least one attribute from a set of attribute terms including name attribute, type attribute, location attribute, social relationship and organization attribute, and category attribute; and wherein said location attribute for said user client account comprises the determined location of said user client.

21. The system of claim 14, wherein said first client account or said second client account has configuration comprising at least one attribute from a set of attribute terms including client authority attribute, system and method attribute, relationship attribute.

22. The system of claim 21, wherein said relationship attribute of said first client account comprises at least one said first relationship condition; and said relationship attribute of said second client account comprises at least one said second relationship condition; and wherein each of said first relationship condition and said second relationship condition comprises a set of relationship terms including social relationship, spatial relationship, time relationship, environmental relationship and behavioral relationship.

23. The system of claim 22, wherein said each of said first relationship condition and said second relationship condition define a set of relation circumstances to be satisfied comprising at least one circumstance from said set of relationship terms.

24. The system of claim 14, wherein said first client or said second client comprises a plurality of clients; and wherein said program of instruction further comprising the steps of:
creating and managing a plurality of landmark client accounts, each landmark account has unique landmark identity attributes with identifying location attribute defined by at least one stationary or dynamic landmark; and
creating and managing a plurality of user accounts, each user account is used by at least one user client to access information services from at least one client terminal device system.

25. The system of claim 14, wherein said first client or said second client has client terminal device system to execute said services on information and applications.

26. The system of claim 14, wherein said determining a relationship between said first client and said second client further comprises the steps of:
receiving and storing client navigation data to keep a navigation history record for at least one of said first client and said second client;
determining the client navigation behavior and motion based on received navigation data and said navigation history record for at least one of said first client and said second client;
determining a relationship between said first client and said second client, wherein said relationship comprising relation circumstances generated based on said client navigation behavior and motion of at least one of said first client and said second client.

* * * * *